(12) United States Patent
Tang et al.

(10) Patent No.: US 12,235,513 B2
(45) Date of Patent: Feb. 25, 2025

(54) OPTICAL ELEMENT DRIVING SYSTEM

(71) Applicant: TDK TAIWAN CORP., Taoyuan (TW)

(72) Inventors: Shun-Chieh Tang, Taoyuan (TW); Chen-Chi Kuo, Taoyuan (TW); Yi-Chun Cheng, Taoyuan (TW); Ming-Chun Hsieh, Taoyuan (TW); Ya-Hsiu Wu, Taoyuan (TW); Ying-Jen Wang, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 7 days.

(21) Appl. No.: 18/314,171

(22) Filed: May 9, 2023

(65) Prior Publication Data
US 2023/0273395 A1 Aug. 31, 2023

Related U.S. Application Data

(63) Continuation of application No. 16/938,596, filed on Jul. 24, 2020, now Pat. No. 11,681,114.
(Continued)

(51) Int. Cl.
*G02B 7/02* (2021.01)
*G02B 7/08* (2021.01)
(Continued)

(52) U.S. Cl.
CPC ............... *G02B 7/028* (2013.01); *G02B 7/02* (2013.01); *G02B 7/08* (2013.01); *G02B 7/09* (2013.01);
(Continued)

(58) Field of Classification Search
CPC .................................................. G02B 27/646
See application file for complete search history.

(56) References Cited

U.S. PATENT DOCUMENTS 6,434,932 B2 8/2002 Hara et al.
9,891,446 B2 2/2018 Wada
(Continued)

FOREIGN PATENT DOCUMENTS

CN 108965663 A 12/2018
EP 2224131 A1 9/2010
(Continued)

OTHER PUBLICATIONS

Extended European search report of EP Application No. 20187651.3 and English translation, dated Mar. 9, 2021, 12 pages.

*Primary Examiner* — Leon W Rhodes, Jr.
(74) *Attorney, Agent, or Firm* — Muncy, Geissler, Olds & Lowe, P.C.

(57) ABSTRACT

An optical element driving system is provided. The optical element driving system includes an optical element driving mechanism and a control assembly. The optical element driving mechanism includes a movable portion, a fixed portion, and a driving assembly. The movable portion is used for connecting to an optical element. The movable portion is movable relative to the fixed portion. The movable portion is in an accommodating space in the fixed portion. The driving assembly is used for driving the movable portion to move relative to the fixed portion. The control assembly provides a driving signal to the driving assembly to control the driving assembly. The driving assembly includes a first driving element, and the material of the first driving element includes shape memory alloy.

13 Claims, 35 Drawing Sheets

Related U.S. Application Data

(60) Provisional application No. 62/894,295, filed on Aug. 30, 2019, provisional application No. 62/879,190, filed on Jul. 26, 2019.

(51) Int. Cl.

| | | |
|---|---|---|
| *G02B 7/09* | (2021.01) | |
| *G02B 7/20* | (2021.01) | |
| *G02B 27/64* | (2006.01) | |
| *G03B 3/10* | (2021.01) | |
| *G03B 5/00* | (2021.01) | |
| *H04N 23/68* | (2023.01) | |

(52) U.S. Cl.
CPC .............. *G02B 7/20* (2013.01); *G02B 27/646* (2013.01); *G03B 3/10* (2013.01); *G03B 5/00* (2013.01); *G03B 2205/0076* (2013.01); *G03B 2206/00* (2013.01); *H04N 23/6812* (2023.01)

(56) References Cited

U.S. PATENT DOCUMENTS

| | | | |
|---|---|---|---|
| 11,681,114 B2* | 6/2023 | Tang | .................. G02B 27/646 |
| | | | 359/823 |
| 2011/0242398 A1 | 10/2011 | Honda et al. | |
| 2013/0002933 A1 | 1/2013 | Topliss et al. | |
| 2014/0055630 A1 | 2/2014 | Gregory et al. | |
| 2019/0191090 A1 | 6/2019 | Murashima et al. | |
| 2020/0166024 A1 | 5/2020 | Webber et al. | |

FOREIGN PATENT DOCUMENTS

| | | |
|---|---|---|
| EP | 3594732 A1 | 1/2020 |
| JP | 2006331052 A | 12/2006 |
| WO | WO-2019/110617 A1 | 6/2019 |

* cited by examiner

OPTICAL ELEMENT DRIVING SYSTEM

CROSS REFERENCE TO RELATED APPLICATIONS

This application is a Continuation of application Ser. No. 16/938,596, filed on Jul. 27, 2020, which claims the benefit of U.S. Provisional Application No. 62/879,190, filed on Jul. 29, 2019, and 62/894,295, filed on Aug. 30, 2019, the entirety of which is incorporated by reference herein.

BACKGROUND OF THE DISCLOSURE

Field of the Disclosure

The present disclosure relates to an optical element driving system.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and more durability. As a result, how to effectively reduce the size of the driving mechanism and how to increase its durability has become an important issue.

BRIEF SUMMARY OF DISCLOSURE

An optical element driving system is provided. The optical element driving system includes an optical element driving mechanism and a control assembly. The optical element driving mechanism includes a movable portion, a fixed portion, a driving assembly, and a position-sensing assembly. The movable portion is used for connecting to an optical element. The movable portion is movable relative to the fixed portion. The movable portion is in an accommodating space in the fixed portion. The driving assembly is used for driving the movable portion to move relative to the fixed portion. The control assembly provides a driving signal to the driving assembly to control the driving assembly. The position-sensing assembly is used for detecting the movement of the movable portion relation to the fixed portion and providing motion-sensing signal to the control assembly.

In some embodiments, the optical element driving system further includes: a stabilized assembly used for providing a predetermined force to the movable portion, an inertia-sensing assembly used for detecting the movement of the optical element driving mechanism and providing inertia-sensing signal to the control assembly, a temperature-sensing assembly used for detecting the temperature of the optical element driving mechanism and providing temperature-sensing signal to the control assembly. The driving assembly includes a first driving element, and the material of the first driving element includes shape memory alloy. The control assembly provides a driving signal based on control information, the control information includes sensing matching information pertaining to the relationship between the movement of the movable portion relative to the fixed portion and the motion-sensing signal, correcting information used for correcting the sensing matching information, a predetermined position used for defining the condition of the movable portion relative to the fixed portion when the optical element driving mechanism is started, a predetermined movable range defining the maximum movable range of the movable portion relative to the fixed portion. In a high-temperature condition, the first limit information is defined as a current or a voltage that increases the temperature of the driving assembly to the phase transition temperature of the driving assembly. In the high-temperature condition, the first limit information is defined as a minimum current or a minimum voltage required to make the driving assembly generate a tension higher than 0. In the high-temperature condition, the first limit information is defined as a minimum current or a minimum voltage required to move the movable portion to the predetermined position. The control information further includes second limiting information used to limit the driving signal. In a low-temperature condition, the second limiting information is defined as the maximum current or the maximum voltage when the shape variation of the driving assembly is less than or equal to a boundary variation, and the boundary variation is defined as the variation of the driving assembly that plastic deformation is about to occur when the driving assembly is deformed. In the low-temperature condition, the second limiting information is defined as the maximum current or the maximum voltage when the shape variation rate of the driving assembly is less than or equal to a boundary variation rate, and the boundary variation rate is defined as the variation rate of the driving assembly that plastic deformation is about to occur when the driving assembly is deformed. The second limiting information is defined as the maximum current or the maximum voltage when a variation of the predetermined movable range is less than a ratio after the driving assembly is used for a certain number of times. The temperature of the high-temperature condition is higher than the temperature of the low-temperature condition. The control information further includes predetermined start information used for determining a predetermined value of the driving signal when the optical element driving mechanism starts. The control information further includes inertia compensating information that includes details about the relationship between the inertia-sensing signal and the driving signal, the motion-sensing signal, or the image signal. The control information further includes high-frequency filtering information, wherein the high-frequency signal in the motion-sensing signal, the inertia-sensing signal, or the driving signal is removed by the control assembly based on the high-frequency filtering information. The frequency of the high frequency defined by the high-frequency filtering information is higher than 10000 Hz. The high-frequency filtering information is defined by the maximum movable frequency of the optical element driving mechanism. The image signal is generated by an optical sensor. The driving signal includes a first group of signals, including: a first signal and a second signal, wherein the frequency of the first signal is different than the frequency of the second signal.

In some embodiments, the control information further includes a correcting procedure, including: finishing the assembly of the optical element driving mechanism; measuring and recording the relationship between the movement of the movable portion relative to the fixed portion using external equipment; updating the sensing matching information and redefining the predetermined start information and the predetermined position; and calculating and analyzing the sensing matching information to gain an accommodating formula, and recording the accommodating formula in the correcting information.

In some embodiments, the control assembly starts the driving assembly based on the temperature-sensing signal, the temperature-compensation information, the motion-sensing signal, and the predetermined start information by providing a driving signal to the driving assembly.

In some embodiments, when the driving assembly is controlled by the driving signal provided by the control assembly, the intensity of the driving signal is higher than the intensity of the first limit information and lower than the intensity of the second limit information.

In some embodiments, during a vibration compensation, the control assembly provides a driving signal based on the inertia-compensation information, the motion-sensing signal, and the inertia-compensation signal.

In some embodiments, the control assembly adjusts the first signal or the second signal based on the temperature-sensing signal and the temperature-compensation information.

In some embodiments, the control assembly adjusts the second signal based on the temperature-sensing signal and the temperature-compensation information, the frequency of the second signal is higher than the frequency of the first signal, and the frequency of the second signal is less than 10000 Hz.

In some embodiments, the amplitude of the second signal is higher than the amplitude of the first signal.

In some embodiments, the driving assembly further includes a second driving element, the material of the second driving element includes shape memory alloy, when the control assembly provides a driving signal, the direction of the driving force generated by the first driving element is different than the direction of the driving force generated by the second driving element. The driving signal further includes a second group of signals, the first group of signals is provided to the first driving element, the second group of signals is provided to the second driving element, the power of the first group of signals is different than the power of the second group of signals, and the control information further includes proportion information used for recording the relationship between the first group of signals and the second group of signals.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1A:
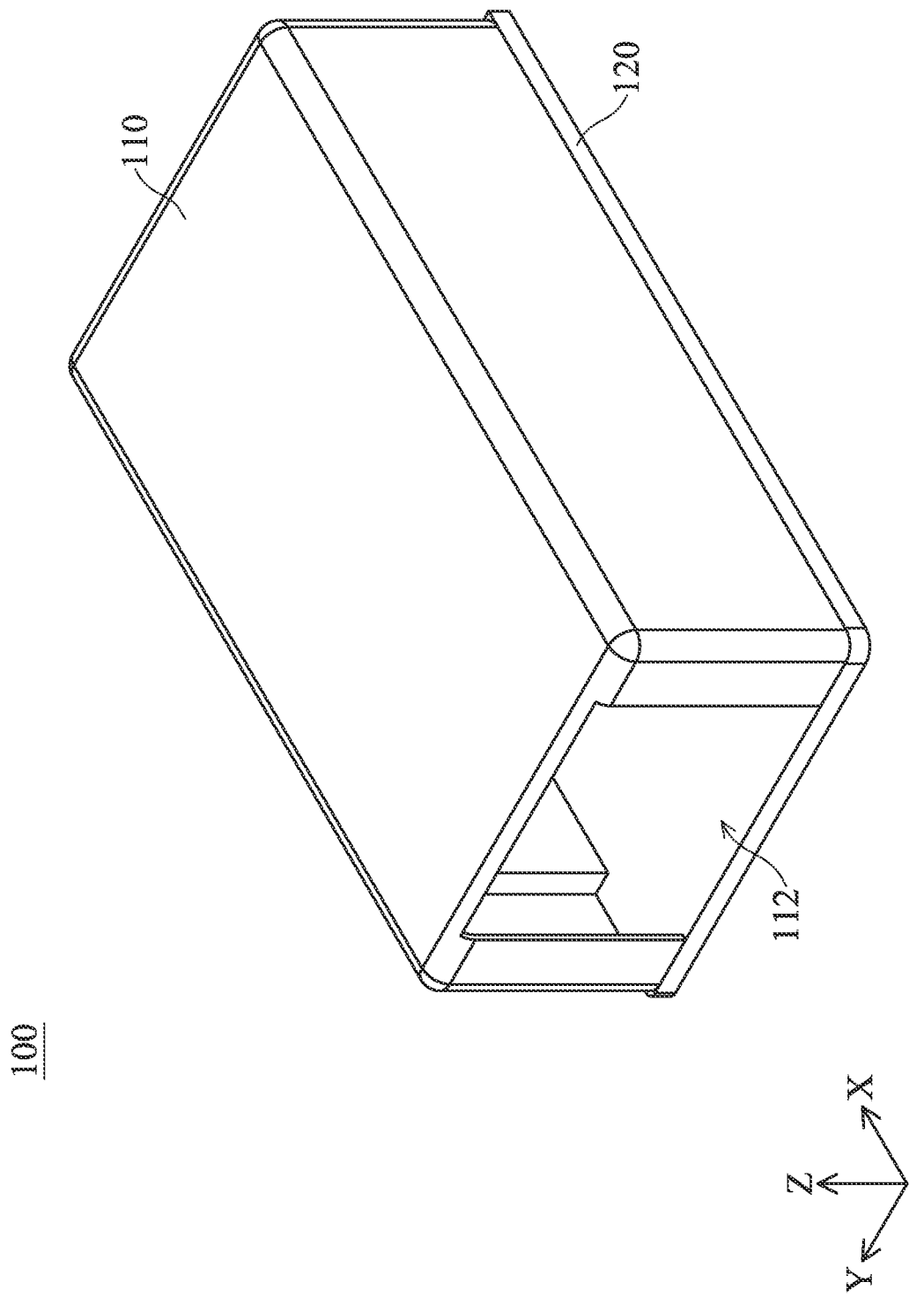
FIG. 1A is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

FIG. 1A is a schematic view of an optical element driving mechanism 100 in some embodiments of the present disclosure. The optical element driving mechanism 100 includes a case 110, a base 120, and other elements disposed between the case 110 and the base 120. An opening 112 is formed on the case 110, and light is allowed to pass through the opening 112 to enter the optical element driving mechanism 100.

Figure 1B:
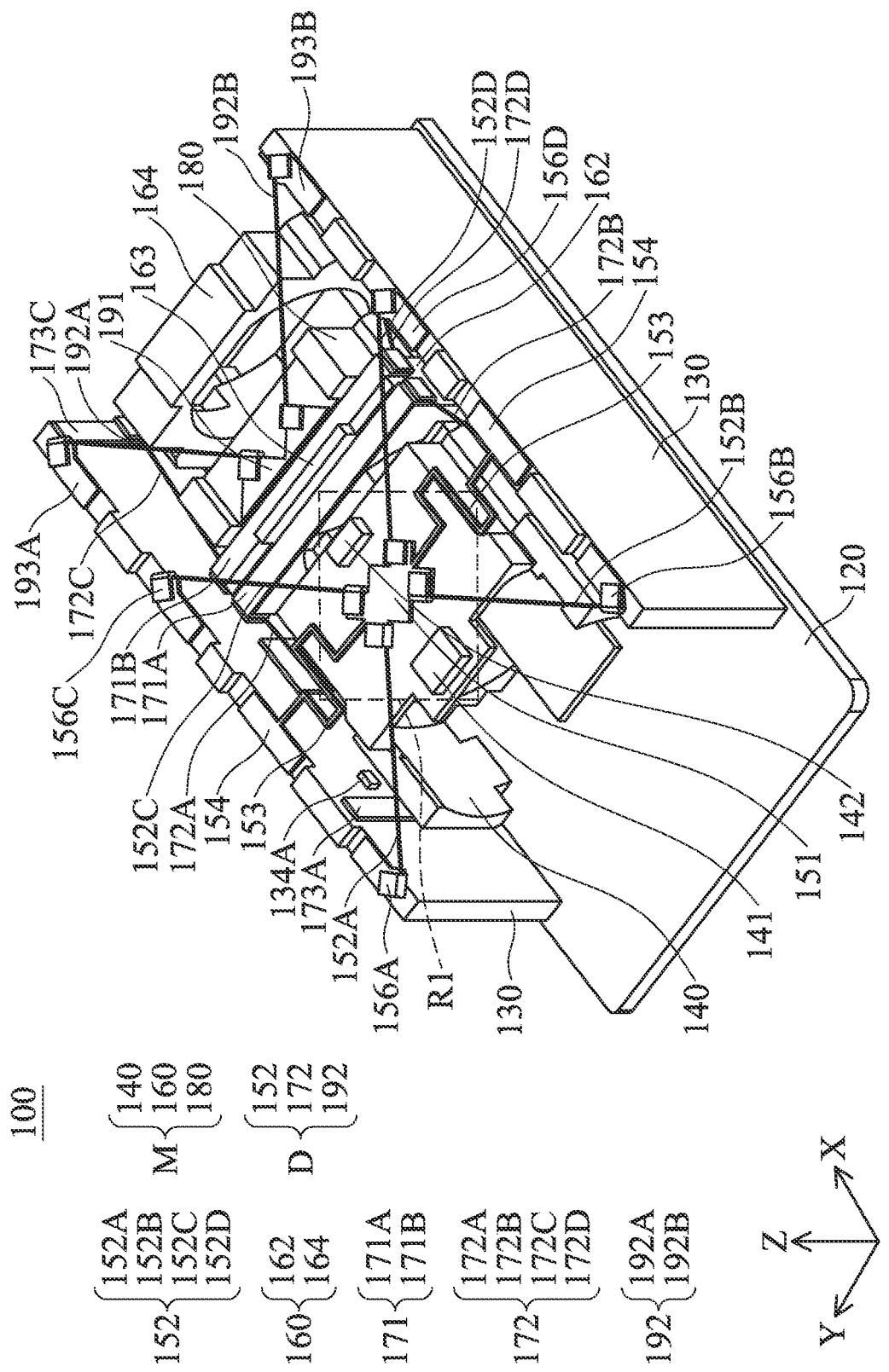
FIG. 1B is a schematic view of the optical element driving mechanism.
Figure 2:
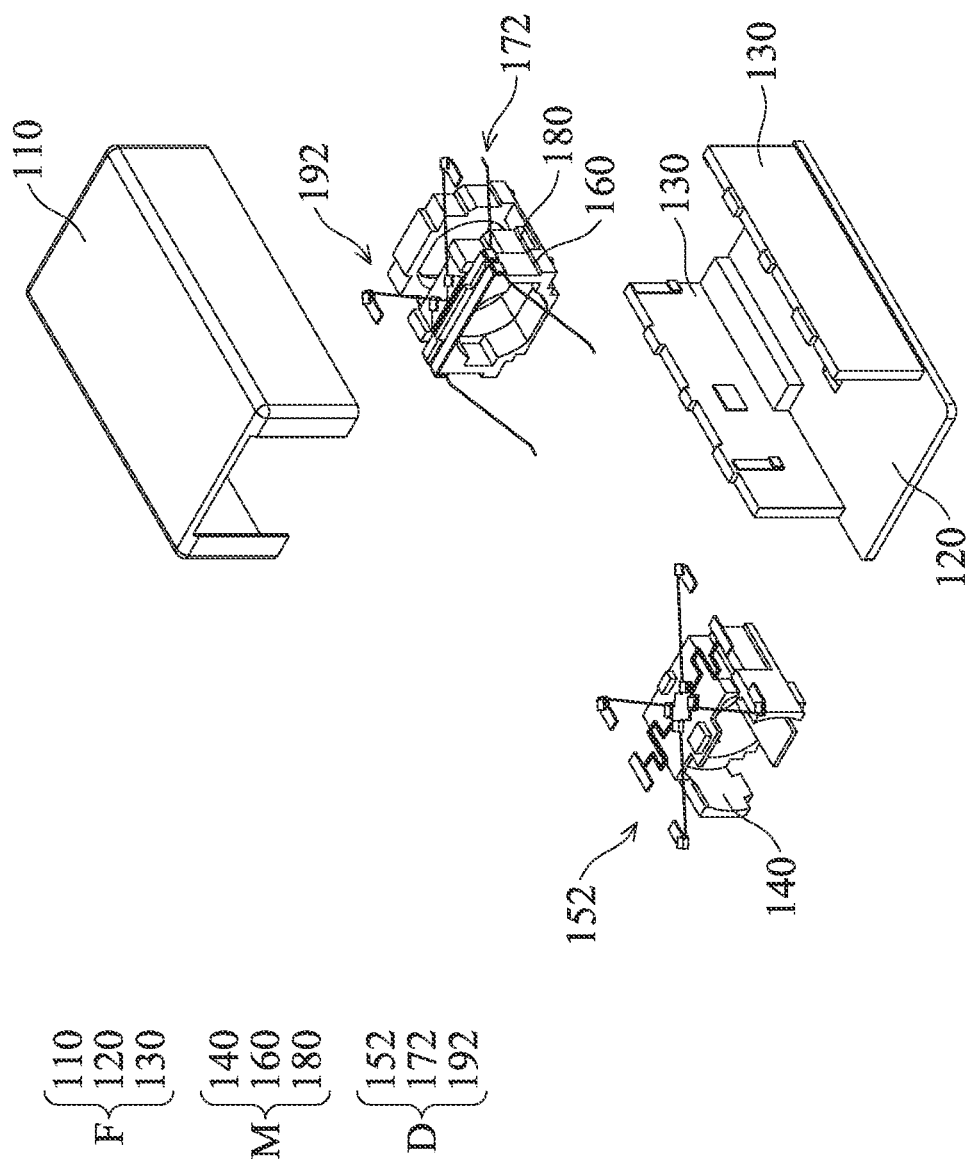
FIG. 2 is an exploded view of the optical element driving mechanism.
Figure 3:
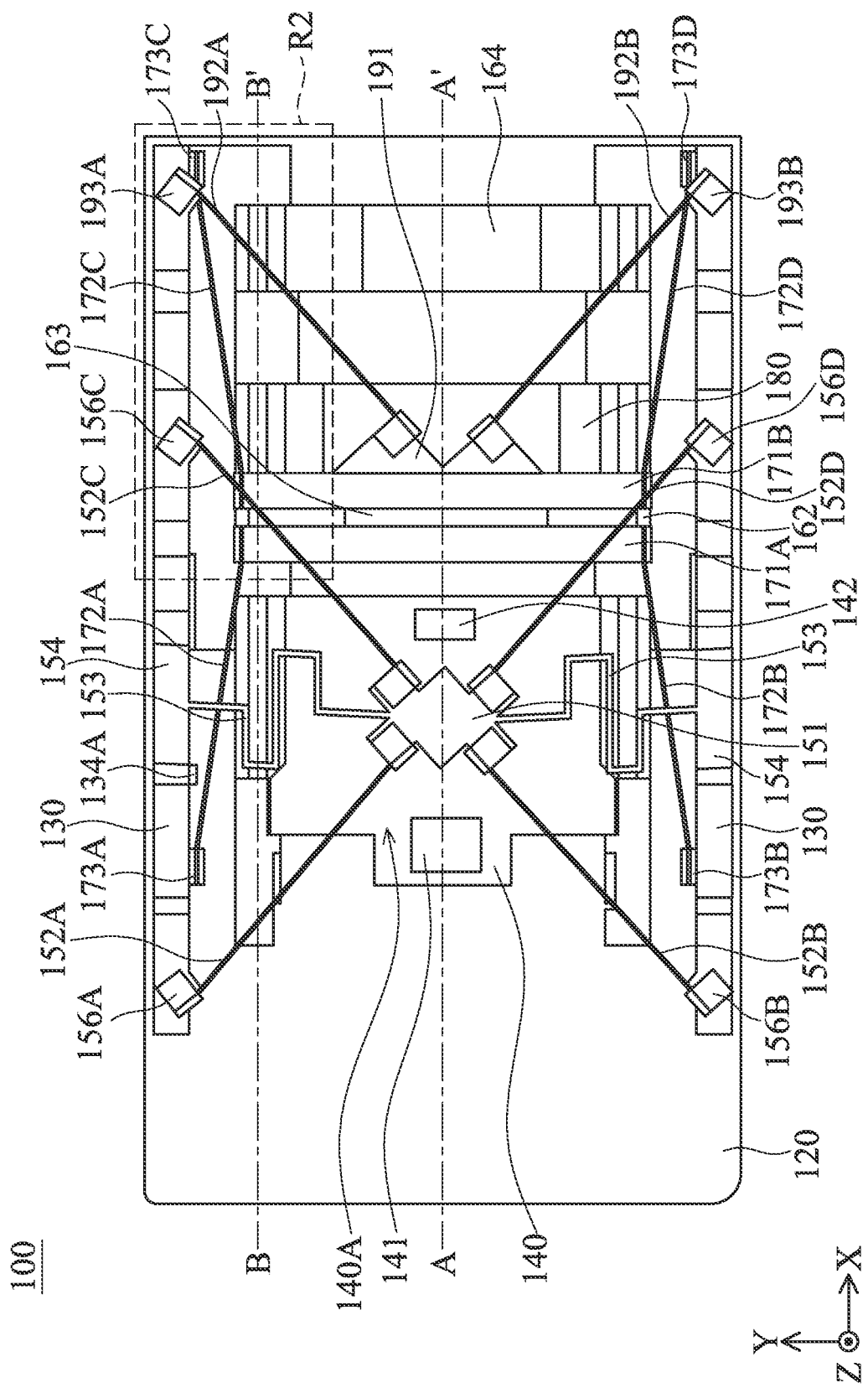
FIG. 3 is a top view of the optical element driving mechanism.
Figure 4A:
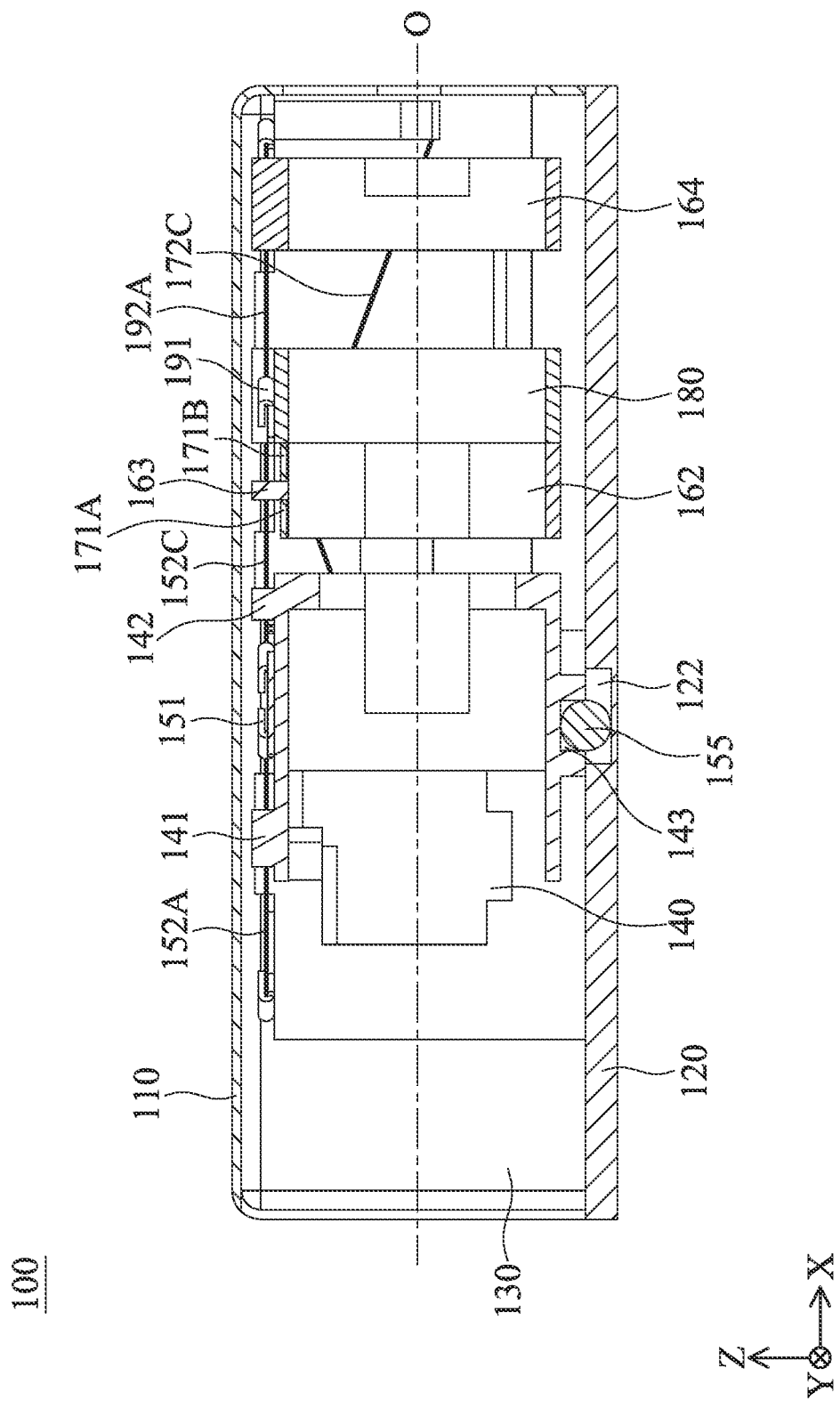
FIG. 4A and FIG. 4B are cross-sectional views illustrated along the lines A-A' and B-B' in FIG. 3.
Figure 4B:
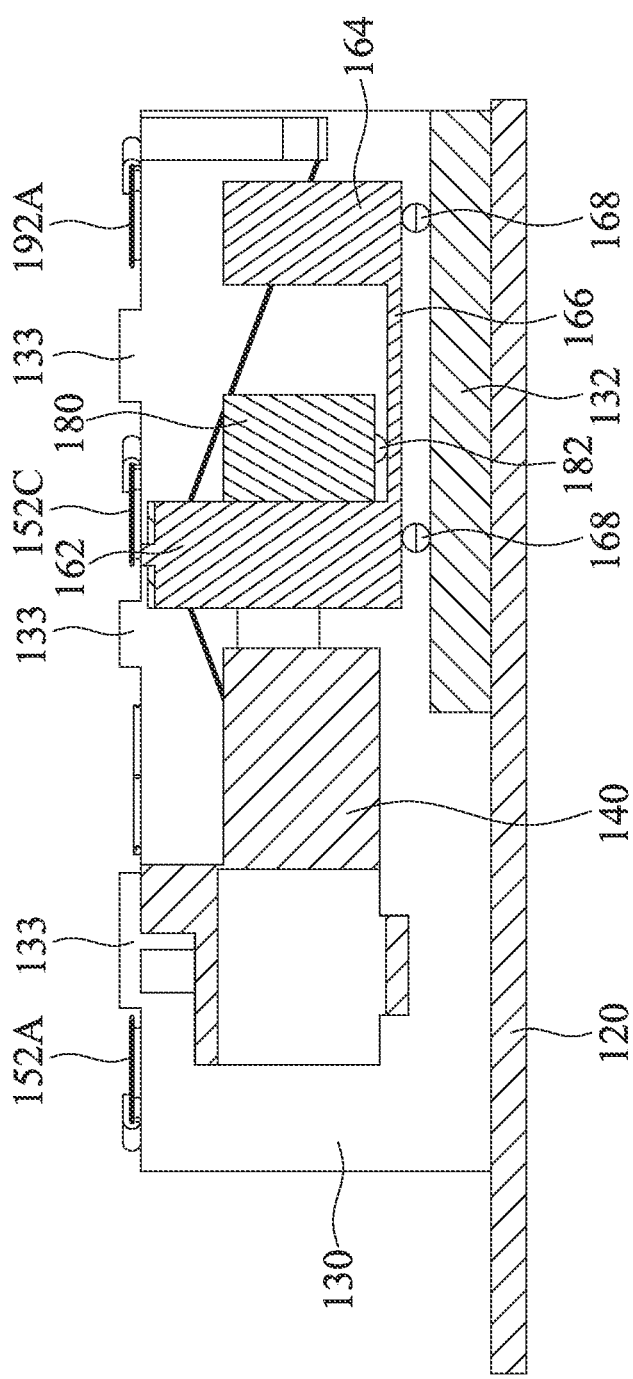

FIG. 1B is a schematic view of the optical element driving mechanism 100, wherein the case 110 is omitted. FIG. 2 is an exploded view of the optical element driving mechanism 100. FIG. 3 is a top view of the optical element driving mechanism 100, wherein the case 110 is omitted. FIG. 4A and FIG. 4B are cross-sectional views illustrated along the lines A-A' and B-B' in FIG. 3. Besides the case 110 and the base 120, the optical element driving mechanism 100 further includes sidewalls 130, a first movable portion 140, a first connecting element 151, a first driving assembly 152, a second movable portion 160, a second connecting element 171, a second driving assembly 172, a third movable portion 180, a third connecting element 191, and a third driving assembly 192.

The sidewalls 130 may be disposed on the base 120, and the case 110, the base 120, and the sidewalls 130 may be called as a fixed portion F used for protecting other elements disposed therein. In some embodiments, a circuit (not shown) may be embedded in the fixed portion F (e.g. the sidewalls 130) to electrically connect to other external elements. For example, the circuit may be connected to a control assembly 430 (FIG. 12) to control the optical element driving mechanism 100. In some embodiments, the material of the fixed portion F may include plastic to ensure the circuit is electrically insulating to the fixed portion, and short-circuits may be avoided.

The first movable portion 140 may be movably disposed on the fixed portion F to connect to a first optical element (not shown). For example, the first optical element may be disposed in a through hole of the first movable portion 140 and may have a main axis O extending in, for example, X direction. Furthermore, as shown in FIG. 4A, a first guiding assembly 155 may be disposed between the base 120 and the first movable portion 140, such as partially disposed in a recess 122 of the base and a recess 143 of the first movable portion 140.

In some embodiments, the first guiding assembly 155 may have a spherical shape, and the first movable portion 140 may move relative to the fixed portion F through the first guiding assembly 155. In other words, the first guiding assembly 155 may guide the movement of the first movable portion 140 relative to the fixed portion F, such as may be used for limiting the movable range of the first movable portion 140. However, the shape of the first guiding assembly 155 is not limited thereto. The shape of the first guiding assembly 155 used for guiding the first movable portion 140 may be semispherical, rod-shaped or grooved. Furthermore, a stopping portion 141 and a stopping portion 142 extending from the first movable portion 140 to the case 110. The stopping portion 141 and the stopping portion 142 may limit the movable range of the first movable portion 140 in the Z direction.

The first connecting element 151 may be disposed on the first movable portion 140. For example, it may be affixed to the first movable portion 140 with glue. Afterwards, the first connecting element 151 may be connected to the fixed portion F (e.g. the sidewall 130) through the first driving assembly 152. In some embodiments, the first driving assembly 152 includes driving elements 152A, 152B, 152C, and 152D. The material of the first driving assembly may include shape memory alloy (SMA), and have striped shapes. Shape memory alloy is an alloy material that can eliminate its deformation at a lower temperature and restore its original shape before deformation after heating. For example, when the shape memory alloy is subjected to a limited plastic deformation at a temperature lower than the phase transition temperature, the shape of the shape memory alloy may be restored to the original shape before deformation by heating.

In some embodiments, when a signal (e.g. voltage or current) is provided to the driving elements 152A, 152B, 152C, and 152D, the temperature may be increased by thermal effect of current, so that the length of the driving elements 152A, 152B, 152C, and 152D may be decreased. On the contrary, if a signal having a lower intensity is provided which makes the heating rate lower than the heat dissipation rate of environment, the temperature of the driving elements 152A, 152B, 152C, and 152D may be decreased, and the length may be increased. Therefore, the first movable portion 140 may be driven by the first driving assembly 152 to move relative to the fixed portion F. For example, the first movable portion 140 may be driven by the first driving assembly 152A to rotate by a first rotational axis (e.g. an axis parallel to the Z axis), or may move in a direction that is perpendicular to the main axis O.

In some embodiments, the driving elements 152A, 152B, 152C, and 152D may be positioned on the same virtual plane (not shown), such a plane having a normal vector in the Z direction. Therefore, the force of the driving assembly 152 applied to the first movable portion 140 may be controlled in the XY plane.

In some embodiments, the driving elements 152A, 152B, 152C, and 152D apply forces that have different directions to the first movable portion 140. In some embodiments, the directions of the forces applied by the driving elements 152A and 152D are substantially opposite, and the directions of the forces applied by the driving elements 152B and 152C are substantially opposite. Moreover, in some embodiments, the direction of the resultant force applied by the driving elements 152A and 152B to the first movable portion 140 is in the —X direction, and the direction of the resultant force applied by the driving elements 152C and 152D to the first movable portion 140 is in the X direction. Therefore, the position of the first movable portion 140 in the X direction may be controlled by controlling the driving elements 152A, 152B, 152C, and 152D.

Furthermore, in some embodiments, the direction of the resultant force applied by the driving elements 152A and 152C to the first movable portion 140 is in the Y direction, and the direction of the resultant force applied by the driving elements 152B and 152D to the first movable portion 140 is in the —Y direction. Therefore, the position of the first movable portion 140 in the Y direction may also be controlled by controlling the driving elements 152A, 152B, 152C, and 152D. In other words, the first driving assembly 152 may control the position of the first movable portion 140 to achieve auto focus or optical image stabilization.

The driving elements 152A, 152B, 152C, and 152D are connected to the fixed portion through the respective electrical connecting elements 156A, 156B, 156C, and 156D disposed on the sidewalls 130. Moreover, the electrical connecting elements 156A, 156B, 156C, and 156D may be electrically connected to the circuit (not shown) embedded in the sidewall 130, so electrical signal may be provided to the electrical connecting elements 156A, 156B, 156C, and 156D to control the first driving assembly 152. Moreover, the first connecting element 151 may be electrically connected to a contact portion 154 through a resilient element 153. For example, the material of the resilient element 153 may have metal to elastically connect to the first connecting element 151 and the contact portion 154. In some embodiments, as shown in FIG. 3, the first driving assembly 152 does not overlap the resilient element 153 when viewed in the Z direction. As a result, the chance of the occurrence of short-circuits between the first driving assembly 152 and the resilient element 153 may be decreased to increase safety.

In some embodiments, the contact portion 154 may be disposed on the sidewalls 130 and may be used for grounding or electrically connected to other elements. In other words, the driving elements 152A, 152B, 152C, and 152D may be electrically connected to each other in parallel, or different signals may be provided to the driving elements 152A, 152B, 152C, and 152D. As a result, the driving elements 152A, 152B, 152C, and 152D may be controlled separately.

In some embodiments, the electrical connecting elements 156A, 156B, 156C, and 156D at least partially exposed from the fixed portion F, and may be partially embedded in the fixed portion F, depending on design requirements. Furthermore, the driving elements 152A, 152B, 152C, and 152D may be clipped in the respective electrical connecting elements 156A, 156B, 156C, and 156D, and they may, for example, be in direct contact with the respective electrical connecting elements 156A, 156B, 156C, and 156D.

The second movable portion 160 may be affixed to the fixed portion F and may be connected to a second optical element (not shown). For example, the second optical element may be disposed in the through hole of the second movable portion 160. For example, as shown in FIG. 4B, the second movable portion 160 may be disposed on the extension portions 132 of the sidewalls 130 by connecting to the extension portions 132 through second guiding assemblies 168. The extension portion 132 may extend from the sidewall 130 to the inner portion of the optical element driving mechanism 100, and may be in contact with the base 120.

In some embodiments, the second guiding assembly 168 may have a spherical shape, and the second movable portion 160 may move relative to the fixed portion F through the second guiding assembly 168. In other words, the second guiding assembly may be used for guiding the movement of the second movable portion 160 relative to the fixed portion F, such as used for limiting the movable range of the second movable portion 160. However, the shape of the second guiding assembly 168 is not limited thereto. A second guiding assembly 168 having a rod shape or a groove shape may also be used to guide the second movable portion 160.

In some embodiments, the second movable portion 160 may include a first portion 162, a second portion 164, and a connecting portion 166. The connecting portion 166 may be disposed between the first portion 162 and the second portion 164 to connect the first portion 162 and the second portion 164. As a result, the first portion 162 and the second portion 164 may move in the same direction. In some embodiments, a second optical element may be disposed in the first portion 162, and a fourth optical element (not shown) may be disposed in the second portion 164.

The second connecting element 171 may include connecting units 171A and 171B, and may be disposed on the second movable portion 160. For example, it may be affixed to the second movable portion 160 with glue. Therefore, the second connecting element 171 may be connected to the fixed portion F (e.g. the sidewalls 130) through the second driving assembly 172. In some embodiments, the second driving assembly 172 includes driving elements 172A, 172B, 172C, and 172D. The material of the second driving assembly 172 includes shape memory alloy, and may be strip-shaped. As a result, the second movable portion 160 may be driven by the second driving assembly 172 to move relative to the fixed portion F or the first movable portion 140.

In some embodiments, the driving element 172A, the connecting element 171A, and the driving element 172B are electrically connected each other in series, and the driving element 172C, the connecting element 171B, and the driving element 172D are electrically connected each other in series. In other words, the driving elements 172A and 172B may be driven at the same time, and the driving elements 172C and 172D may be driven at the same time. In some embodiments, a protruding portion 163 may be positioned on a second movable portion 160 between the connecting unit 171A and 171B to connect the connecting unit 171A and 171B, so short-circuits may be prevented from occurring between the connecting unit 171A and 171B.

In some embodiments, forces in different directions may be applied to the second movable portion 160 through the driving elements 172A, 172B, 172C, and 172D. In some embodiments, the direction of the resultant force applied by the driving elements 172A and 172B to the second movable portion 160 is in the —X direction, and the direction of the resultant force applied by the driving elements 172C and 172D to the second movable portion 160 is in the X direction. Therefore, the position of the second movable portion 160 in the X direction may be controlled by controlling the driving elements 172A, 172B, 172C, and 172D.

Moreover, in some embodiments, the direction of the resultant force applied by the driving elements 172A and 172C to the second movable portion 160 along the Y axis is in the Y direction, and the direction of the resultant force applied by the driving elements 172B and 172D to the second movable portion 160 along the Y axis is in −Y direction. Therefore, the position of the second movable portion 160 in the Y direction may be controlled by controlling the driving elements 172A, 172B, 172C, and 172D. In other words, the second driving assembly 172 may be used to control the position of the second movable portion 160 to achieve auto focus or optical image stabilization. In some embodiments, as shown in FIG. 3, the resilient element 153 at least partially overlaps the second driving assembly (e.g. the driving element 172A or 172B) when viewed in the Z direction.

The driving elements 172A, 172B, 172C, and 172D are respectively connected to the fixed portion F through the electrical connecting elements 173A, 173B, 173C, and 173D that are disposed on the sidewalls 130. In some embodiments, the electrical connecting elements 173A, 173B, 173C, and 173D are partially exposed from the fixed portion F, and a portion of the electrical connecting elements 173A, 173B, 173C, and 173D may be embedded in the fixed portion F, depending on design requirements. Furthermore, the driving elements 172A, 172B, 172C, and 172D may be clipped in the respective electrical connecting elements 173A, 173B, 173C, and 173D. For example, the driving elements 172A, 172B, 172C, and 172D may be in direct contact with the respective electrical connecting elements 173A, 173B, 173C, and 173D.

The third movable portion 180 may be disposed on the second movable portion 160. For example, as shown in FIG. 4B, the third movable portion 180 may be connected to the second movable portion 160 through the third guiding assemblies 182, and a third optical element (not shown) may be disposed on the third movable portion 180. In some embodiments, the third guiding assembly 182 may have a spherical shape, and the third movable portion 180 may move relative to the second movable portion 160 through the third guiding assembly 182. In other words, the third guiding assembly 182 may guide the movement of the third movable portion 180 relative to the second movable portion 160, such as may be used for limiting the movable range of the third movable portion 180. However, the shape of the third guiding assembly 182 is not limited thereto. The shape of the third guiding assembly 182 used for guiding the third movable portion 180 may be semispherical, rod-shaped or grooved.

The third connecting element 191 may be disposed on the third movable portion 180. For example, it may be affixed to the third movable portion 180 with glue. Therefore, the third connecting element 191 may be connected to the second movable portion 192 through the third driving assembly 192. In some embodiments, the third driving assembly 192 includes driving elements 192A and 192B. The material of the third driving assembly 192 includes shape memory alloy, and may be strip-shaped. As a result, the third movable portion 180 may be driven by the third driving assembly 192 to move relative to the fixed portion F, the first movable portion 140, or the second movable portion 180. Furthermore, the direction of the resultant force applied by the driving elements 192A and 192B to the third movable portion 180 may be in the X direction, so the third driving assembly 192 may drive the third movable portion 180 to move in the X direction. The driving assembly 192A may be electrically connected to the driving assembly 192B in series through the third connecting element 191.

In some embodiments, an additional resilient element (not shown) may be disposed between the third movable portion 180 and the second movable portion 160 (or between the third movable portion and the fixed portion F) to be elastically connected to the third movable portion 180 and the second movable portion 160 (or the fixed portion F). Therefore, a force in the —X direction may be provided to the third movable portion 180 to control the position of the third movable portion 180 in the X direction. In some embodiments, as shown in FIG. 3, the first driving assembly 152 does not overlap the third driving assembly 192 when viewed in the Z direction. As a result, the size of the optical element driving mechanism 100 in the Z direction may be reduced to achieve miniaturization.

In some embodiments, as shown in FIG. 4B, a plurality of protruding portions 133 that extend in the Z direction may be provided on the sidewalls 130. In the X direction, the first driving assembly 152 and the third driving assembly 192 may be disposed between the protruding portions 133. In the Z direction, the distance between the protruding portion 133 and the case 110 (not shown in FIG. 4B) is greater than the distance between the first driving assembly 152 (or the third driving assembly 192) and the case 110. Therefore, the first driving assembly 152 or the third driving assembly 192 may be prevented from colliding the case 110, so the durability of the optical element driving mechanism 100 may be enhanced.

The driving elements 192A and 192B are respectively connected to the fixed portion F through the electrical connecting elements 193A and 193B that are disposed on the sidewalls 130. In some embodiments, the electrical connecting elements 193A and 193B are partially exposed from the fixed portion F, and a portion of the electrical connecting elements 193A and 193B may be embedded in the fixed portion F, depending on design requirements. Furthermore, the driving elements 192A and 192B may be clipped in the respective electrical connecting elements 193A and 193B. For example, the driving elements 192A and 192B may be in direct contact with the respective electrical connecting elements 193A and 193B.

Figure 4C:
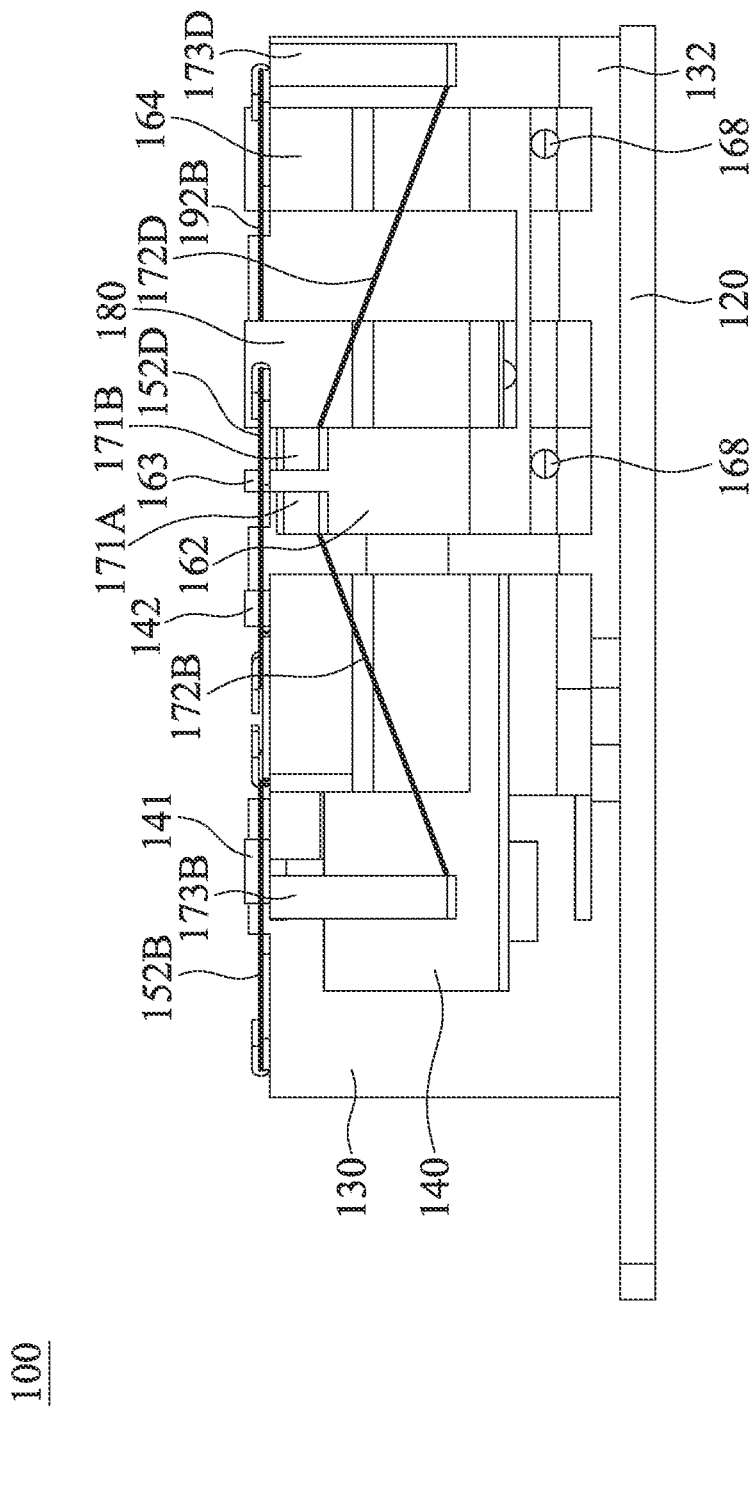
FIG. 4C is a side view of the optical element driving mechanism when viewed in the Y direction.

FIG. 4C is a side view of the optical element driving mechanism 100 viewed from the Y direction, wherein the case 110 and one of the sidewalls 130 are omitted. As shown in FIG. 4C, the first driving assembly 152, the second driving assembly 172, and the third driving assembly 192 do not overlap each other. Therefore, the size of the optical element driving mechanism 100 in the Y direction may be reduced to achieve miniaturization.

Figure 5:
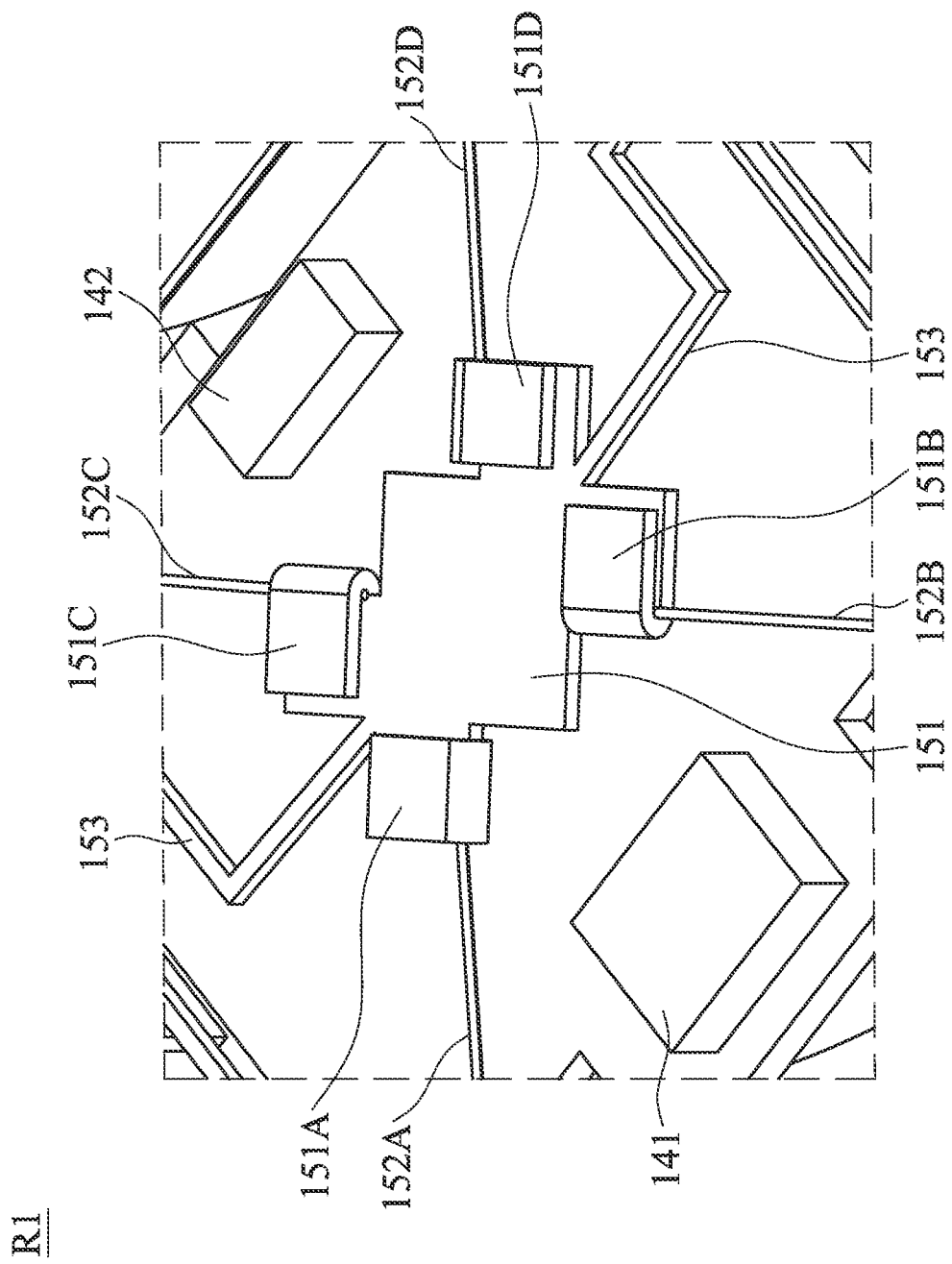
FIG. 5 is an enlarged view of the region R1 in FIG. 1B.

FIG. 5 is an enlarged view of the region R1 in FIG. 1. As shown in FIG. 5, the first connecting element 151 may include connecting portions 151A, 151B, 151C, and 151D having bent shapes. The driving elements 152A, 152B, 152C, and 152D may be respectively disposed in the connecting portions 151A, 151B, 151C, and 151D, such as be clipped in the connecting portions 151A, 151B, 151C, and 151D. Therefore, the driving elements 152A, 152B, 152C, and 152D may be electrically connected to the first connecting element 151 through the connecting portions 151A, 151B, 151C, and 151D. In other words, the driving elements 152A, 152B, 152C, and 152D are electrically connected to each other.

Figure 6:
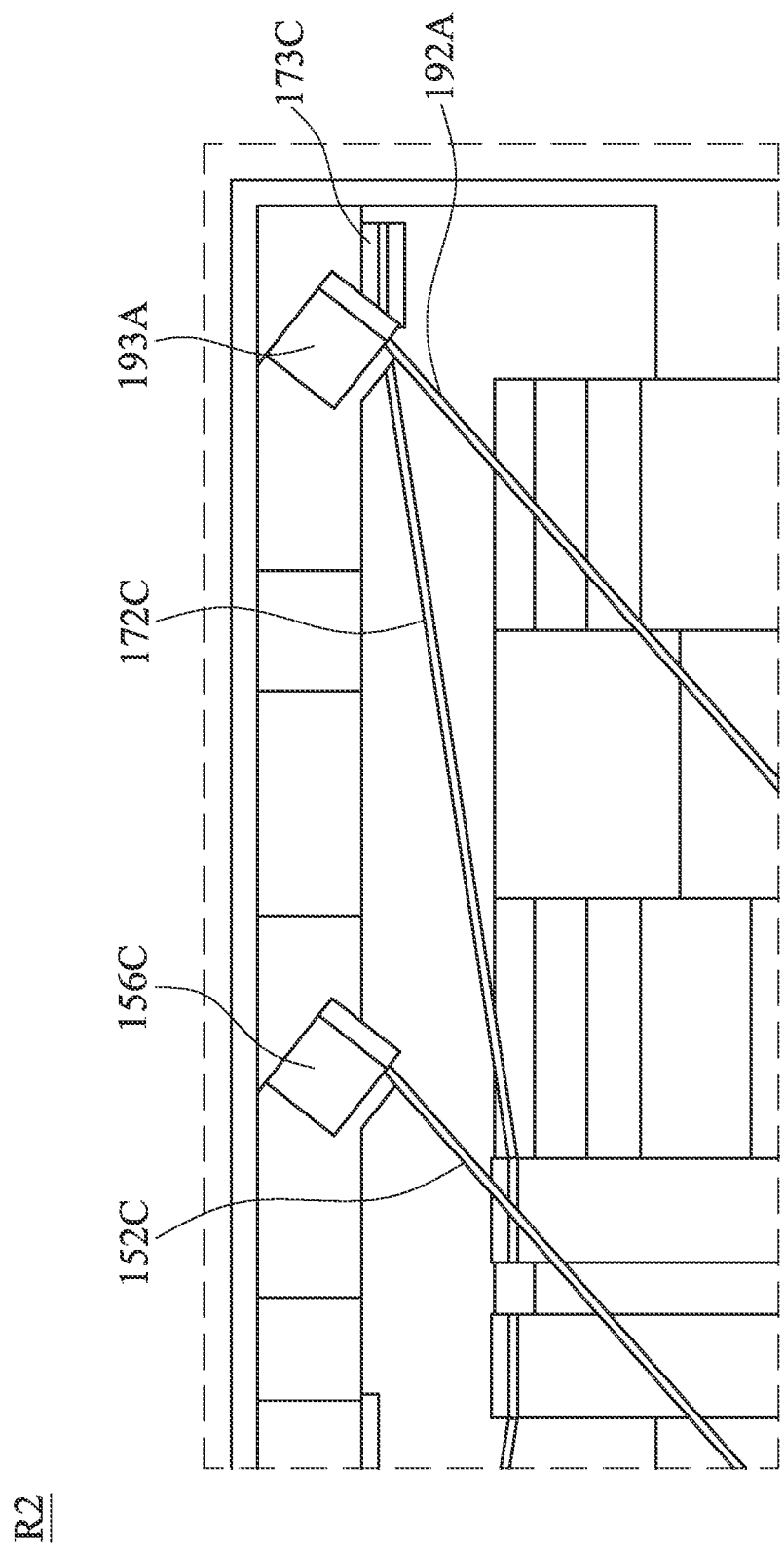
FIG. 6 is an enlarged view of the region R2 in FIG. 3.

FIG. 6 is an enlarged view of the region R2 in FIG. 3. As shown in FIG. 6, the second driving assembly 172 partially overlaps the first driving assembly 152 or the third driving assembly 192 when viewed in the Z direction. As a result, the size of the optical element driving mechanism 100 in other directions may be reduced. Moreover, when viewed in the Z direction, the driving element 172A does not overlap the driving element 172C, and the driving element 172B does not overlap the driving element 172D (FIG. 3) to achieve miniaturization. As shown in FIG. 6, the portion of the driving assembly 172 that is clipped in the second connecting element 171 may be exposed from the second connecting element 171.

Figure 7:
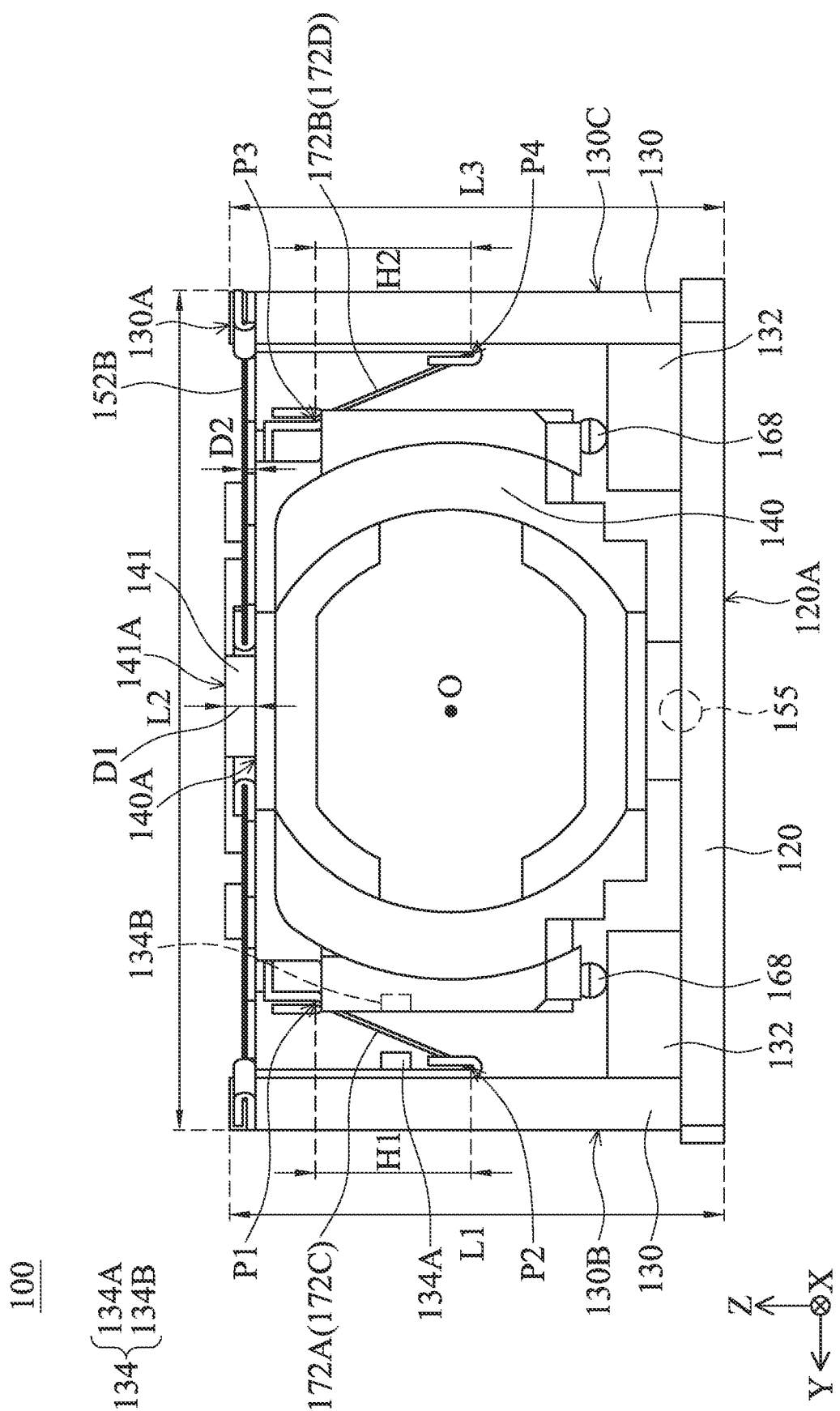
FIG. 7 is a schematic view of the optical element driving mechanism when viewed in the Y direction.

FIG. 7 is a schematic view of the optical element driving mechanism 100 when viewed in the X direction. As shown in FIG. 7, the fixed portion F is rectangular and has a first side (left side in FIG. 7), a second side (upper side in FIG. 7), and a third side (right side in FIG. 7) connected each other in sequence. In some embodiments, the first driving assembly 152 and the second driving assembly 172 are positioned at different sides of the fixed portion F.

For example, as shown in FIG. 7, the first driving assembly 152 is positioned at the second side, and the second driving assembly 172 is positioned at the first side and the third side, and the third driving assembly 192 (FIG. 1B) is positioned at the first side and the third side. The first side has a length L1, the second side has a length L2 (such as the distance between the outer surface 130B of the left sidewall 130 and the outer surface 130C of the right sidewall 130 in the Y direction), and the third side has a length L3. The first length L1 is substantially equal to the third length L3 (such as the distance between the bottom surface 120A of the base 120 and the top surface 130A of the sidewall 130 in the Z direction), and the length L2 is greater than the length L1 and the length L3. Moreover, as shown in FIG. 1B, the second driving assembly 192 is also positioned at the second side. In other words, when viewed in the X direction, the first driving assembly 152 does not overlap the second driving assembly 172, and the third driving assembly 192 does not overlap the second driving assembly 172 to reduce the size of the optical element driving mechanism 100 in the X direction. Furthermore, the first driving assembly 152 and the third driving assembly 192 are positioned at the second side, so at least a portion of the first driving assembly 152 overlaps the third driving assembly, so the size of the optical element driving mechanism 100 in other directions may be reduced to achieve miniaturization.

In some embodiments, as shown in FIG. 7, the driving element 172 may overlap the driving element 172C, and the driving element 172B may overlap the driving element 172D. In other words, the driving element 172A and the driving element 172C may be positioned on a virtual plane (not shown), and the driving element 172B and the driving element 172D may be positioned on another virtual plane (not shown). The two virtual planes are different and parallel to X direction. Therefore, the driving element 172A may be connected to the first movable portion 140 through a connection point P1, and connected to the sidewall 130 of the fixed portion F through a connection point P2. The driving element 172B may be connected to the first movable portion 140 through a connection point P3, and connected to the sidewall 130 of the fixed portion F through a connection point P4. In the Z direction, a height difference H1 is between the connection points P1 and P2, and a height difference H2 is between the connection points P3 and P4. In other words, the driving elements 172A and 172B (or 172C and 172D) have a portion that extends in the Z direction. Furthermore, in some embodiments, the driving elements 172A, 172B, 172C, 172D, 192A, and 192B are not parallel, so the movable direction of the second movable portion 160 and the third movable portion 180 may be increased.

In some embodiments, as shown in FIG. 1B, FIG. 3, and FIG. 7, the optical element driving mechanism 100 further includes a position sensor 134A and a sensing magnetic element 134B, and the position sensor 134A and the sensing magnetic element 134B may be called as a position-sensing assembly 134. The position sensor 134A may be affixed to the fixed portion, such as disposed on the sidewall 130, and the sensing magnetic element 134B may be disposed on the first movable portion 140.

In some embodiments, the position sensor 134A may include, for example, a Hall sensor, a magnetoresistance effect sensor (MR sensor), a giant magnetoresistance effect sensor (GMR Sensor), a tunneling a magnetoresistance effect sensor (TMR Sensor), or a fluxgate sensor, and the sensing magnetic element 134B may be, for example, a magnet. For example, the position sensor 134A may detect the magnetic field variation caused by the sensing magnetic element 134B that moves with the first movable portion 140, so the position of the first movable portion 140 may be received. Although only a set of position-sensing assembly 134 is shown in FIG. 7, the present disclosure is not limited thereto. In some embodiments, position sensing assemblies that corresponds to the second movable portion 160 or the third movable portion 180 may be provided to get the position of the second movable portion 160 or the third movable portion 180.

As shown in FIG. 7, when viewed in the X direction, the position-sensing assembly 134 does not overlap the first driving assembly 152, the second driving assembly 172, and the third driving assembly 192. Therefore, the size of the optical element driving mechanism 100 in the X direction may be reduced to achieve miniaturization. Furthermore, in some embodiments, the height of the stopping portion 141 and the height of the stopping portion 142 may be identical in the Z direction. The distance between the top surface 140A of the first movable portion 140 to the top surface 141A of the stopping portion 141 may be D1, and the distance D1 is greater than the distance D2 between the first driving assembly 152 and the top surface 140A. Therefore, the first driving assembly 152 may be prevented from colliding with the case 110 when the first movable portion 140 moves in the Z direction. Instead, the movable range of the first movable portion 140 in the Z direction may be restricted by the stopping portion 141 or the stopping portion 142 to protect the first driving assembly 152, so the durability of the optical element driving mechanism 100 may be improved.

In some embodiments, as shown in FIG. 7, when viewed in the X direction, the second driving assembly 172 and the first driving assembly 152 are positioned at different sides of the fixed portion F, and the second driving assembly 172 and the third driving assembly 192 are positioned at different sides of the fixed portion F. Furthermore, the first guiding assembly 155 and the first driving assembly 152 are positioned at different sides of the fixed portion F, the first guiding assembly 155 and the second driving assembly 172 are positioned at different sides of the fixed portion F, the first guiding assembly 155 and the third driving assembly 192 are positioned at different sides of the fixed portion F. The second guiding assembly 168 and the first driving assembly 152 are positioned at different sides of the fixed portion F, the second guiding assembly 168 and the second driving assembly 172 are positioned at different sides of the fixed portion F, the second guiding assembly 168 and the third driving assembly 192 are positioned at different sides of the fixed portion F. In some embodiments, the third guiding assembly 182 and the first driving assembly 152 are positioned at different sides of the fixed portion F, the third guiding assembly 182 and the second driving assembly 172 are positioned at different sides of the fixed portion F, the third guiding assembly 182 and the third driving assembly 192 are positioned at different sides of the fixed portion F.

For example, the second guiding assembly 168 is positioned at the second side, and the third guiding assembly is positioned at the second side. In other words, as shown in FIG. 7, when viewed in the X direction, the first guiding assembly 155 does not overlap the second guiding assembly 168, second guiding assembly 168 does not overlap the third guiding assembly 182, and the third guiding assembly 182 does not overlap the first guiding assembly 155.

Figure 8A:
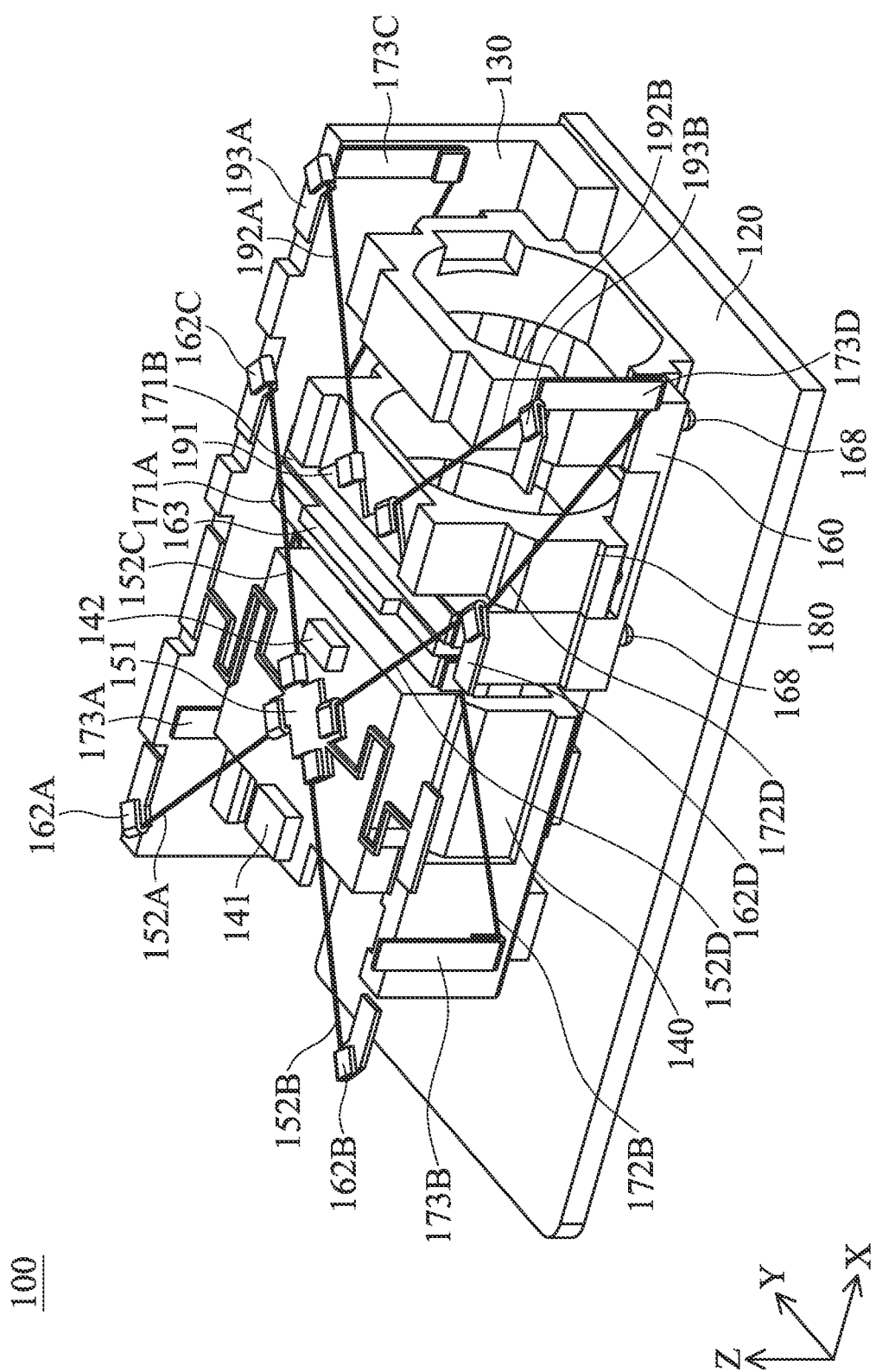
FIG. 8A, FIG. 8B, and FIG. 8C are schematic views when the optical element driving mechanism is operating.
Figure 8B:
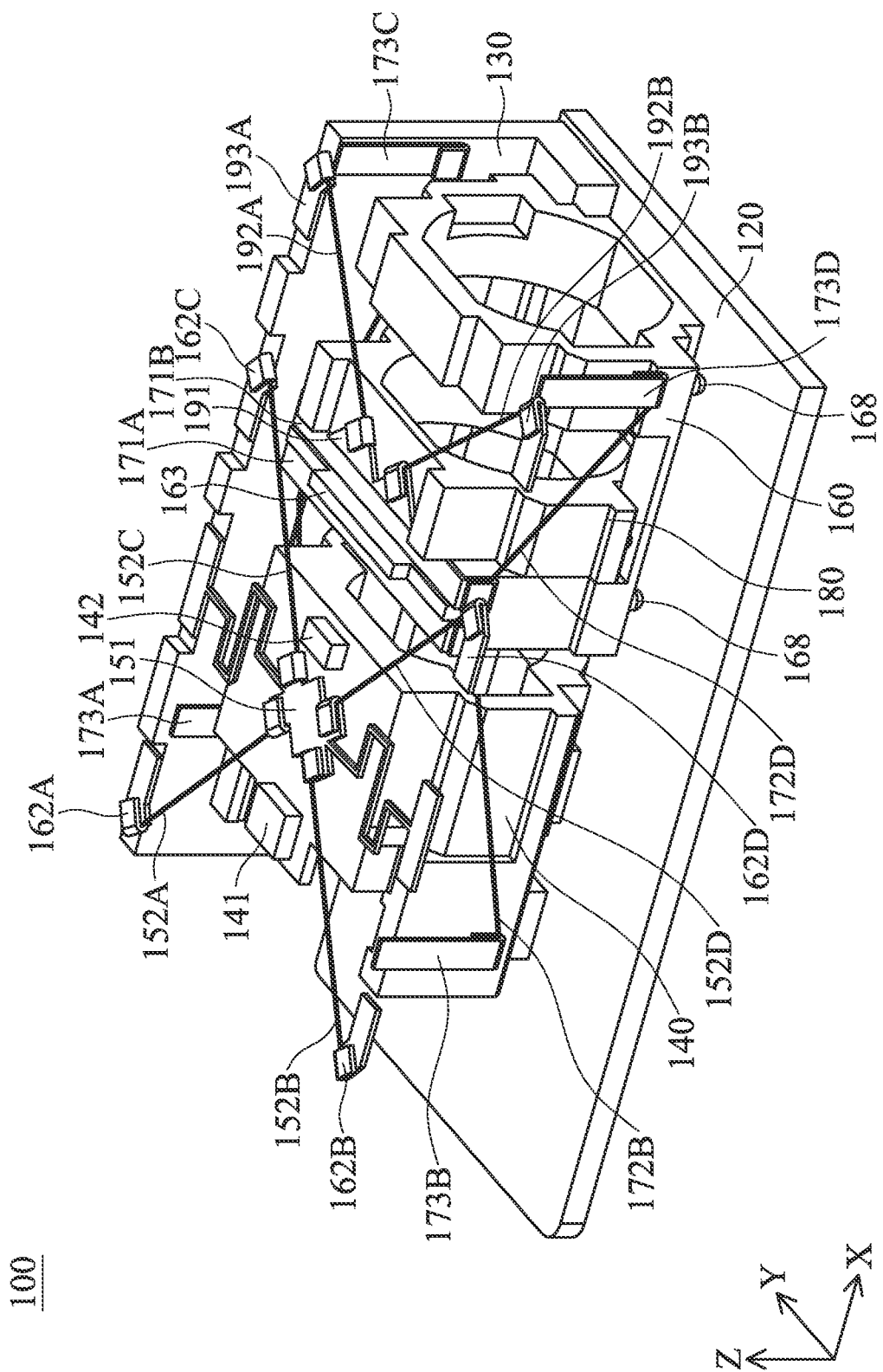
Figure 8C:
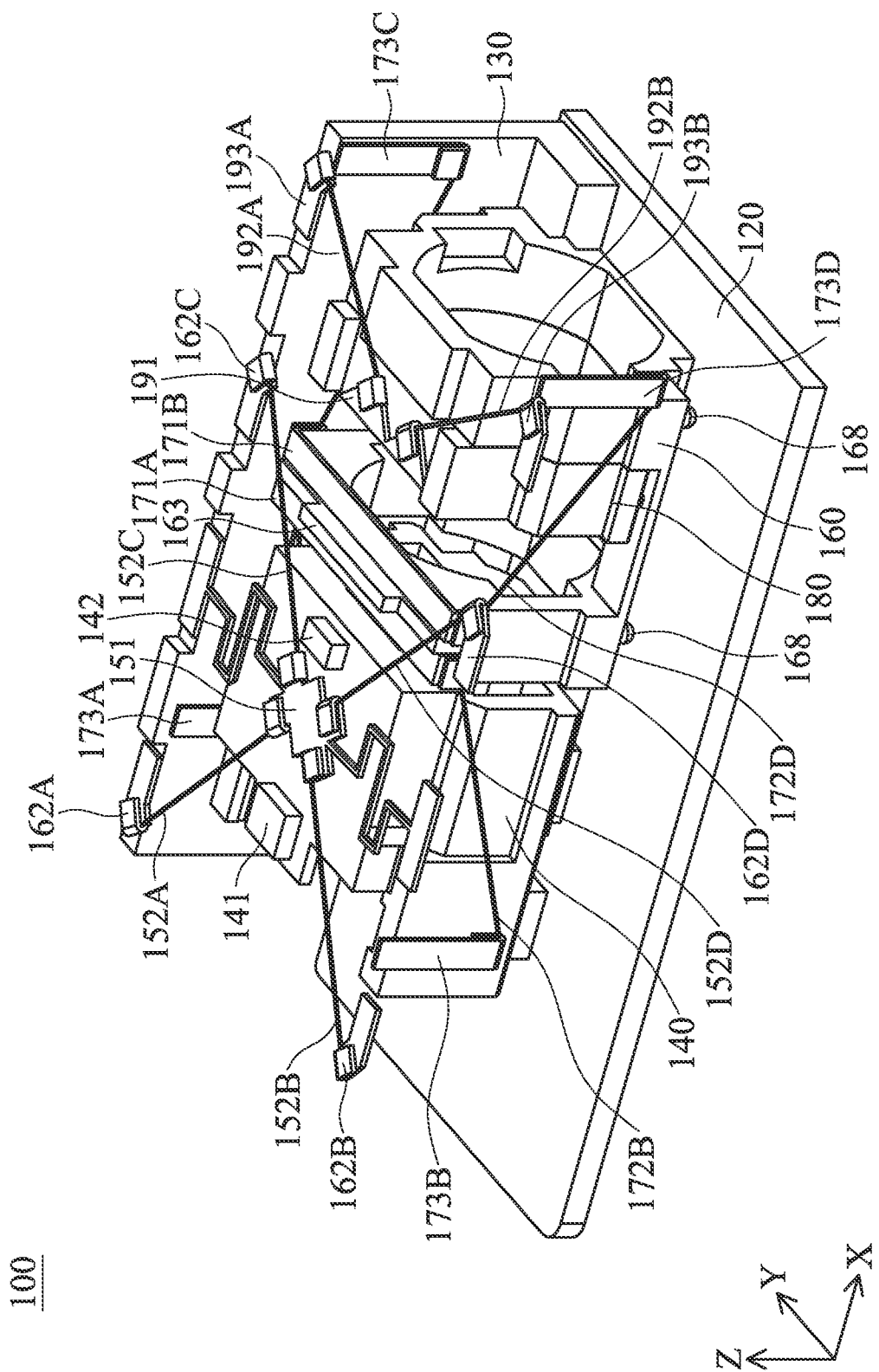

FIG. 8A, FIG. 8B, and FIG. 8C are schematic views when the second movable portion 160 and the third movable portion 180 of the optical element driving mechanism 100 are operating. The case 110 and one of the sidewalls 130 are omitted to show the relationship between the elements more clearly. It should be noted that the third movable portion 180 is in the second movable portion 160 in the X direction. As shown in FIG. 8A and FIG. 8B, when the second movable portion 160 moves in the X direction, the third movable portion 180 may move together with the second movable portion 160 relative to the fixed portion F. Furthermore, as shown in FIG. 8A and FIG. 8C, the third movable portion 180 may move relative to the second movable portion 160, and the stroke (or movable range) of the second movable portion 160 relative to the fixed portion F may be different than the stroke (or movable range) of the third movable portion 180 relative to the fixed portion F. Therefore, the second optical element (not shown) disposed in the second movable portion 160 and the third optical element (not shown) disposed in the third movable portion 180 may be driven individually to achieve desired function (e.g. focus or depth of field adjustment).

The first movable portion 140, the second movable portion 160, and the third movable portion 180 are arranged in the main axis O, so the first optical element, the second optical element, and the third optical element (not shown) disposed therein may also be arranged in the main axis O. Moreover, because the first movable portion 140, the second movable portion 160, and the third movable portion 180 may move along the main axis O, auto focus and depth of field adjustment may be achieved to improve the performance of the optical element driving mechanism 100.

In some embodiments, additional optical elements may be provided in the optical element driving mechanism 100 to change the path of light. For example, additional mirror or prism may be provided on the side of the first movable portion 140 that is away from the second movable portion 160 to change the light path to parallel the main axis O, to allow the light enters the first optical element, the second optical element, and the third optical element.

Figure 9A:
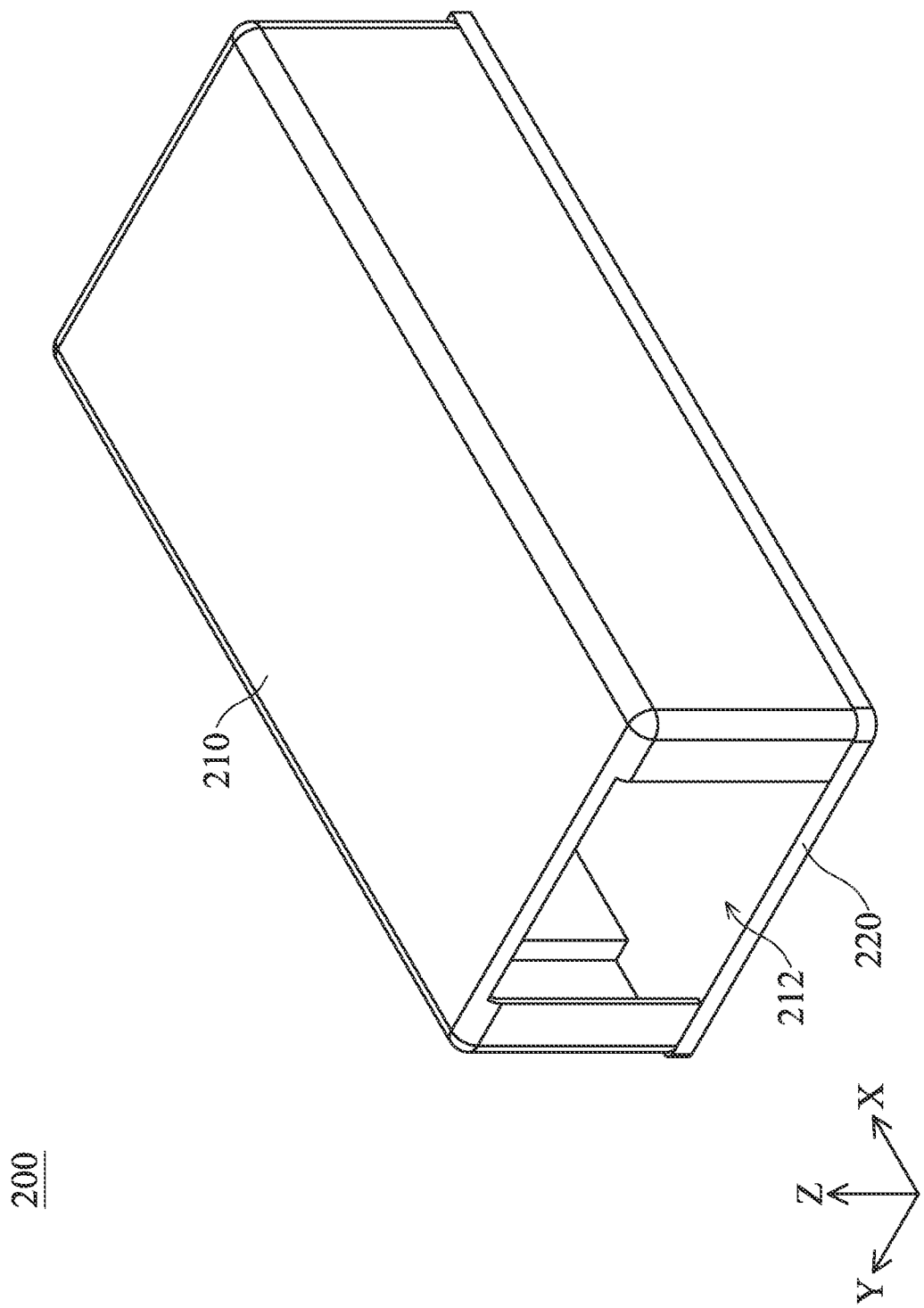
FIG. 9A is a schematic view of an optical element driving mechanism in some embodiments of the present disclosure.

FIG. 9A is a schematic view of an optical element driving mechanism 200 in some embodiments of the present disclosure. The optical element driving mechanism 200 includes a case 210, a base 220, and other elements disposed between the case 210 and the base 220. An opening 212 is formed on the case 210, and light is allowed to pass through the opening 212 to enter the optical element driving mechanism 200.

Figure 9B:
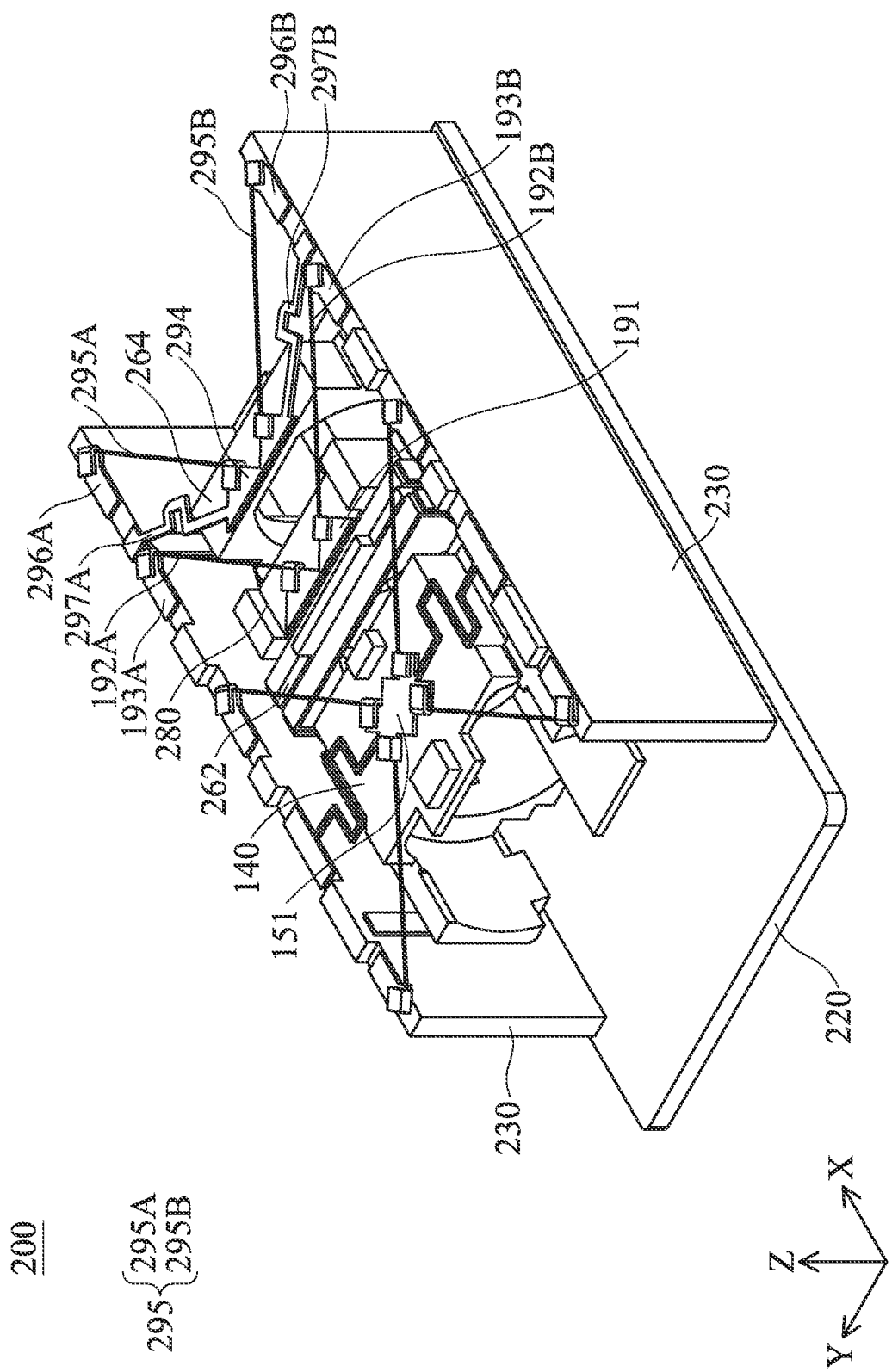
FIG. 9B is a schematic view of the optical element driving mechanism, and the case is omitted.
Figure 9C:
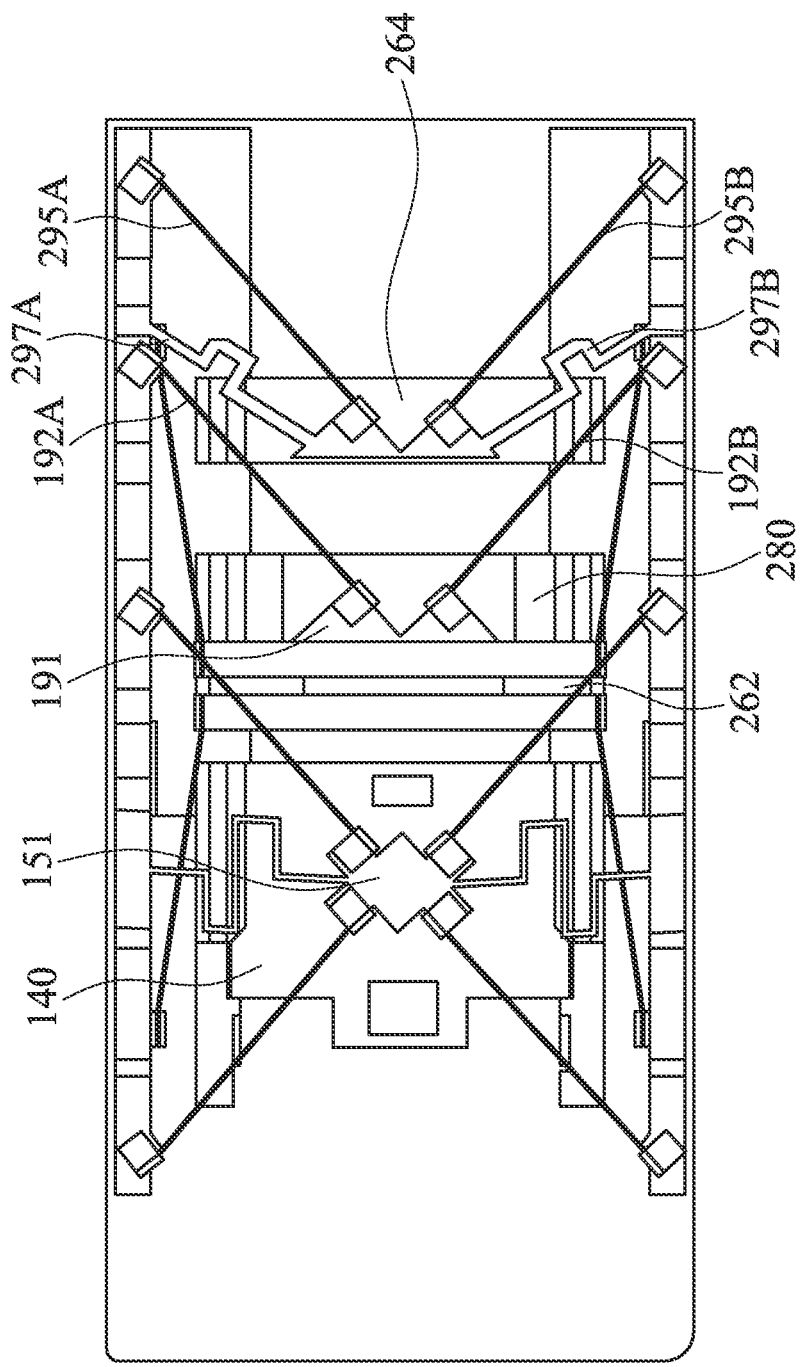
FIG. 9C is a top view of the optical element driving mechanism, and the case is omitted.

FIG. 9B is a schematic view of the optical element driving mechanism 200, and the case 210 is omitted. FIG. 9C is a top view of the optical element driving mechanism 200, and the case 210 is omitted. The structure of the optical element driving mechanism 200 is substantially similar to that of the optical element driving mechanism 100, and the description of similar elements will not be repeated here. It should be noted that the second movable portion 160 of the optical element driving mechanism 100 is replaced by a second movable portion 262 and a fourth movable portion 264, and the third movable portion 180 of the optical element driving mechanism 100 is replaced by a third movable portion 280. A fourth optical element (not shown) may be disposed in the fourth movable portion 264.

A fourth connecting element 294 may be disposed on the fourth movable portion 264. For example, it may be affixed to the fourth movable portion 264 with glue. The fourth connecting element 294 may be connected to the sidewall 230 (fixed portion F) through a fourth driving assembly 295. In some embodiments, the fourth driving assembly 295 includes driving elements 295A and 295B. The material of the fourth driving assembly 295 may include shape memory alloy, and the fourth driving assembly 295 may be strip-shaped. Therefore, the fourth movable portion 264 may be driven by the fourth driving assembly 295 to move relative to the fixed portion F, the first movable portion 140, the second movable portion 262, or the third movable portion 280. Furthermore, the direction of the resultant force applied by the driving elements 295A and 295B to the fourth movable portion 264 is in the X direction, so the fourth driving assembly 295 may drive the fourth movable portion 264 to move in the X direction. The driving element 295A may be electrically connected to the driving element 295B in series through the fourth connecting element 294.

In some embodiments, additional resilient elements 297A and 297B may be disposed between the fourth movable portion 264 and the sidewall 230 to elastically connect the fourth movable portion 264 to the sidewall 230. As a result, a force in the X direction may be provided to the fourth movable portion 264 to control the position of the fourth movable portion 264 in the X direction. In some embodiments, as shown in FIG. 9C, the first driving assembly 152 does not overlap the fourth driving assembly 295 when viewed from the Z direction. As a result, the size of the optical element driving in the Z direction may be reduced to achieve miniaturization. In some embodiments, in the X direction, the resilient elements 297A and 297B at least partially overlaps the driving assembly 172 in the X direction.

Figure 9D:
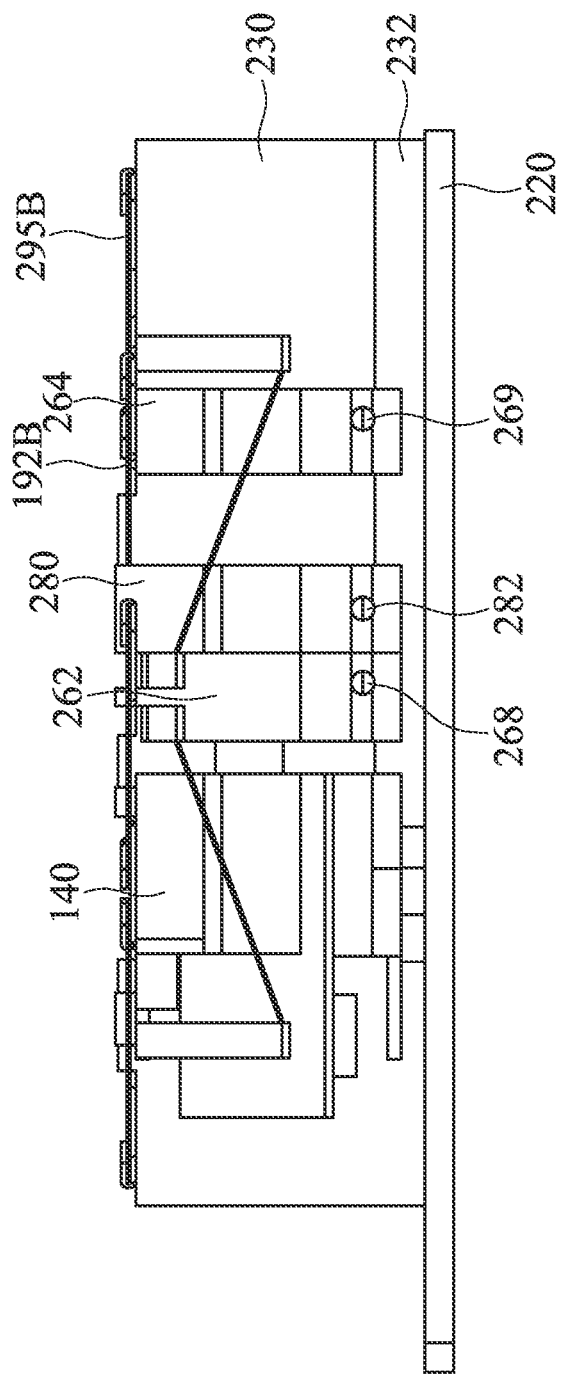
FIG. 9D is a side view of the optical element driving mechanism, and the case is omitted.

FIG. 9D is a side view of the optical element driving mechanism 200, and the case 210 is omitted. As shown in FIG. 9D, the second movable portion 262, the third movable portion 280, and the fourth movable portion 264 are separated from each other, and connected to the extending portions 232 of the sidewalls 230 through second guiding assemblies 268, third guiding assemblies 282, and fourth guiding assemblies 269, respectively. Therefore, the second movable portion 262, the third movable portion 280, and the fourth movable portion 264 may move separately to achieve auto focus, depth of field adjustment, or image magnification, and the performance of the optical element driving mechanism 200 may be enhanced.

Figure 10A:
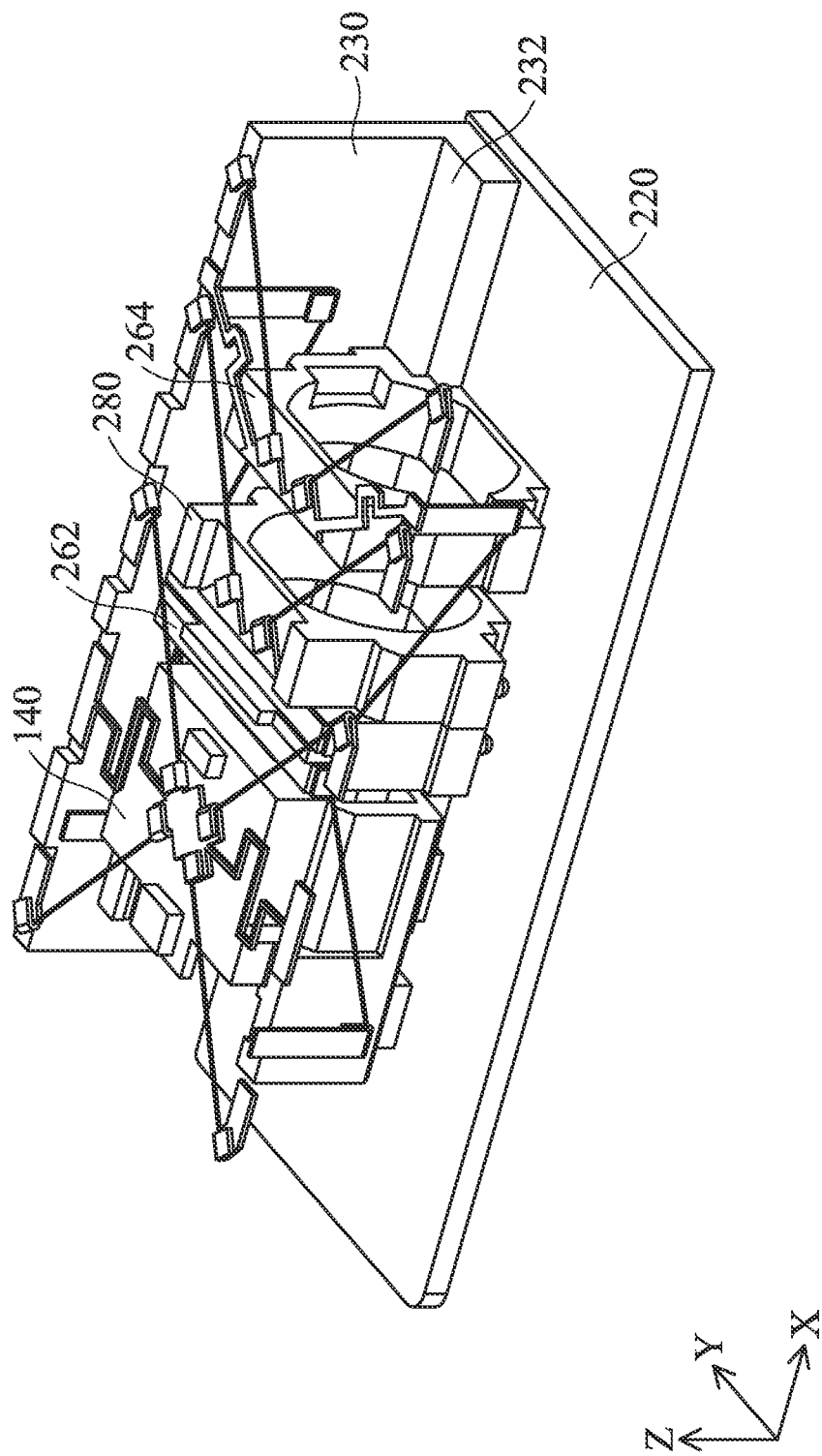
FIG. 10A, FIG. 10B, FIG. 10C, and FIG. 10D are schematic views when the second movable portion, the third movable portion, and the fourth movable portion of the optical element driving mechanism are in motion.
Figure 10B:
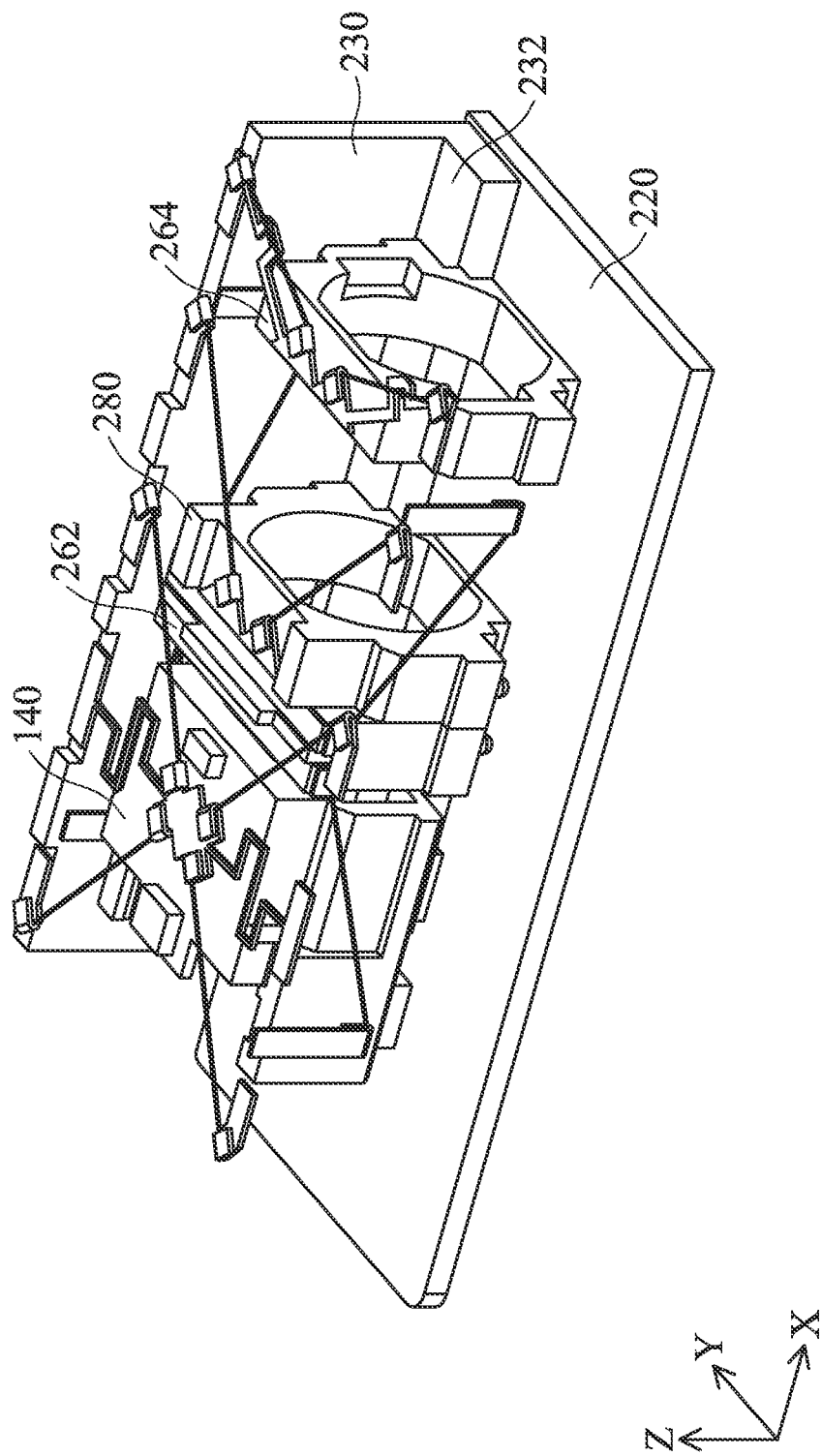
Figure 10C:
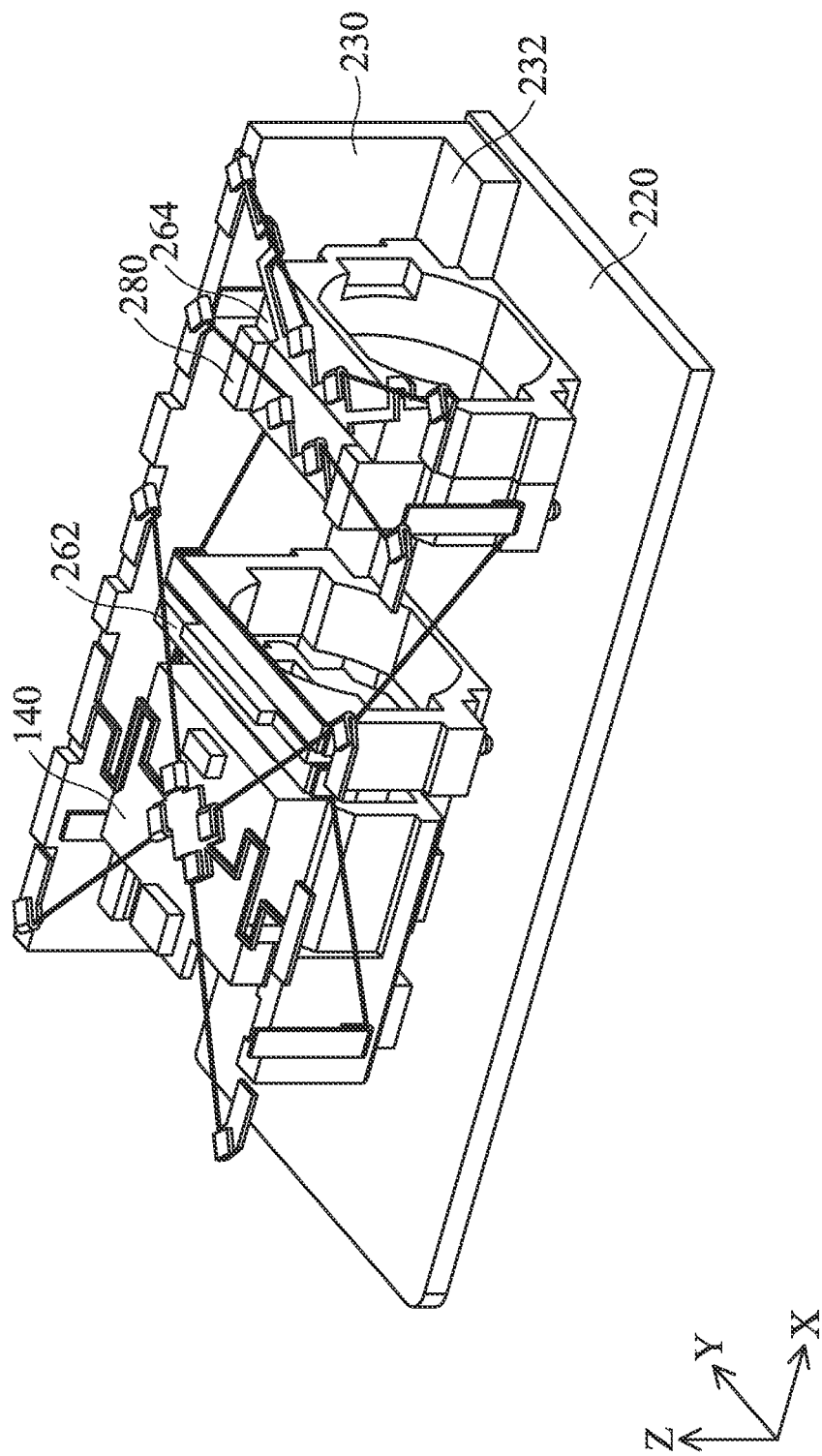
Figure 10D:
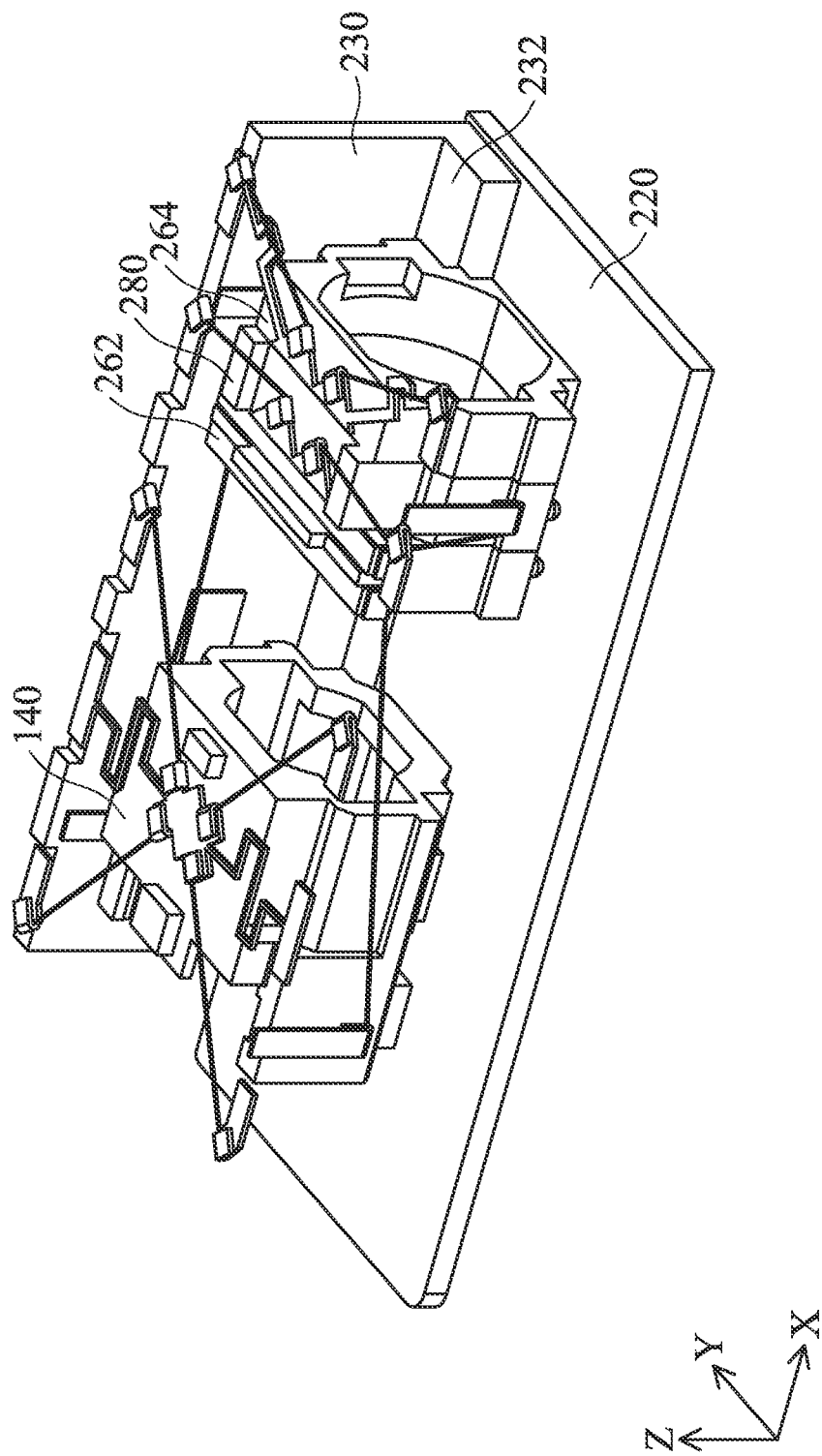

FIG. 10A, FIG. 10B, FIG. 10C, and FIG. 10D are schematic views when the second movable portion 262, the third movable portion 280, and the fourth movable portion 264 of the optical element driving mechanism 200 are in motion. The case 210 and one of the sidewalls 230 are omitted for clarity. It should be noted that the third movable portion 280 is between the second movable portion 262 and the fourth movable portion 264. As shown in FIG. 10A and FIG. 10B, when the fourth movable portion 264 moves in the X direction, the second movable portion 262 and the third movable portion 280 may not move with the fourth movable portion 264. As shown in FIG. 10B and FIG. 10C, when the third movable portion 280 moves in the X direction, the second movable portion 262 and the fourth movable portion 264 may not move with the third movable portion 280. As shown in FIG. 10C and FIG. 10D, when the second movable portion 262 moves in the X direction, the third movable portion 280 and the fourth movable portion 264 may not move with the second movable portion 262.

Therefore, the second optical element, the third optical element, the fourth element (not shown) that are respectively disposed in the second movable portion 262, the third movable portion 280, and the fourth movable portion 264 may be driven individually to achieve desired functions (e.g. focus, depth of field adjustment, or magnification).

Figure 11A:
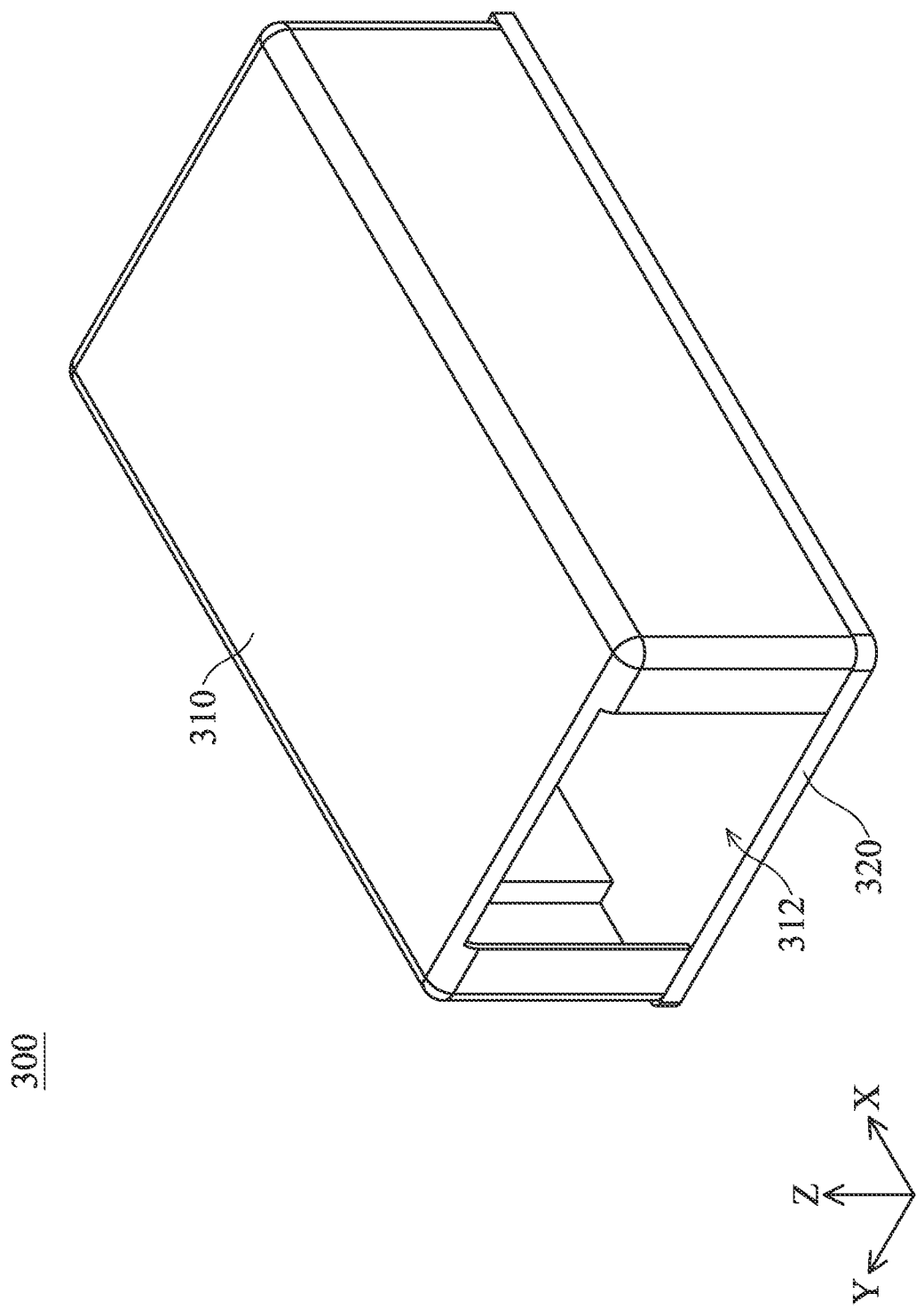
FIG. 11A is a schematic view of an optical element driving mechanism in some embodiments of the present disclosure.

FIG. 11A is a schematic view of an optical element driving mechanism 300 in some embodiments of the present disclosure. The optical element driving mechanism 300 includes a case 310, a base 320, and other elements disposed between the case 310 and the base 320. An opening 312 is formed on the case 310 to allow light entering the optical element driving mechanism 300 through the opening 312.

Figure 11B:
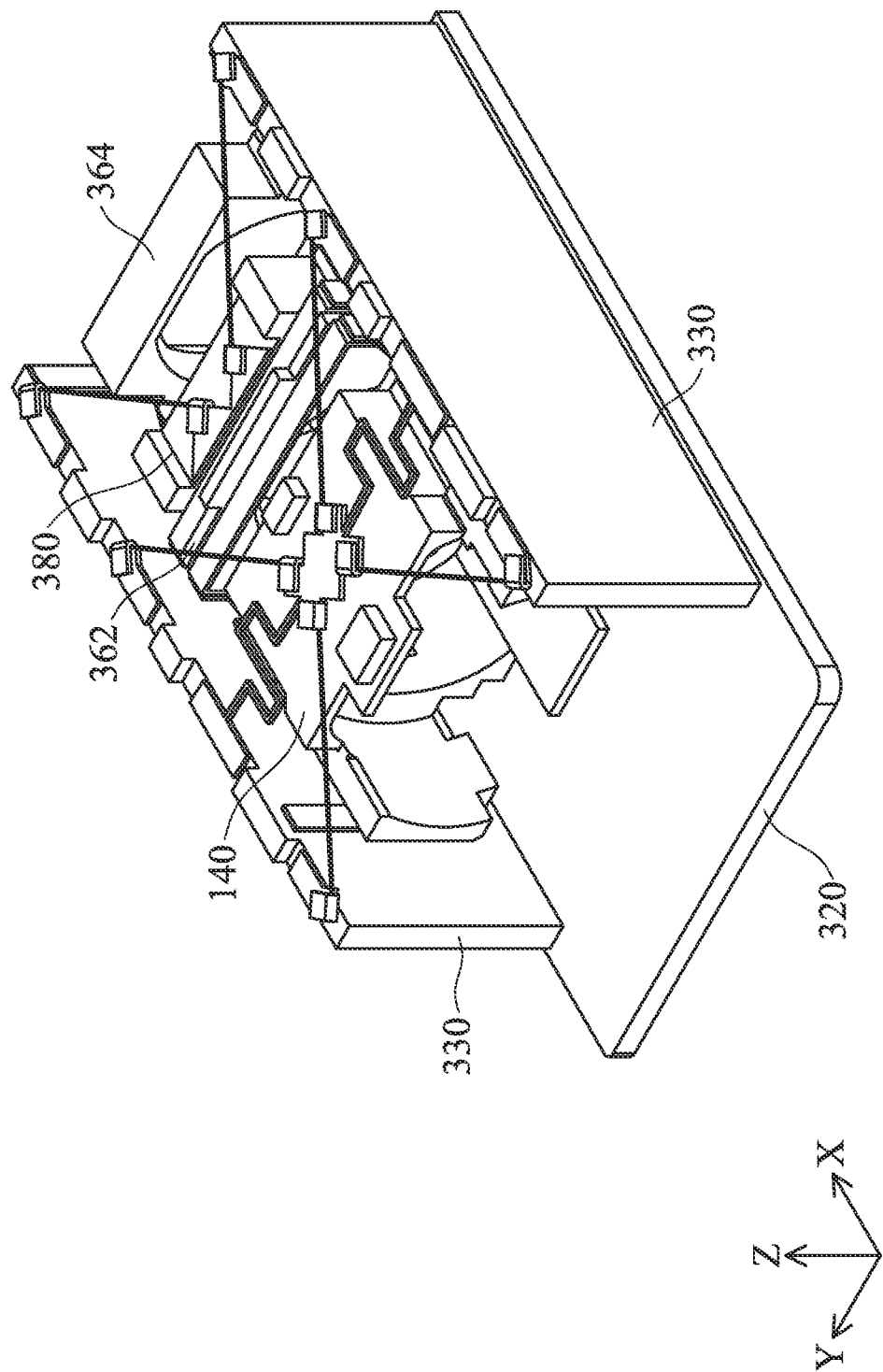
FIG. 11B is a schematic view of the optical element driving mechanism, and the case is omitted.
Figure 11C:
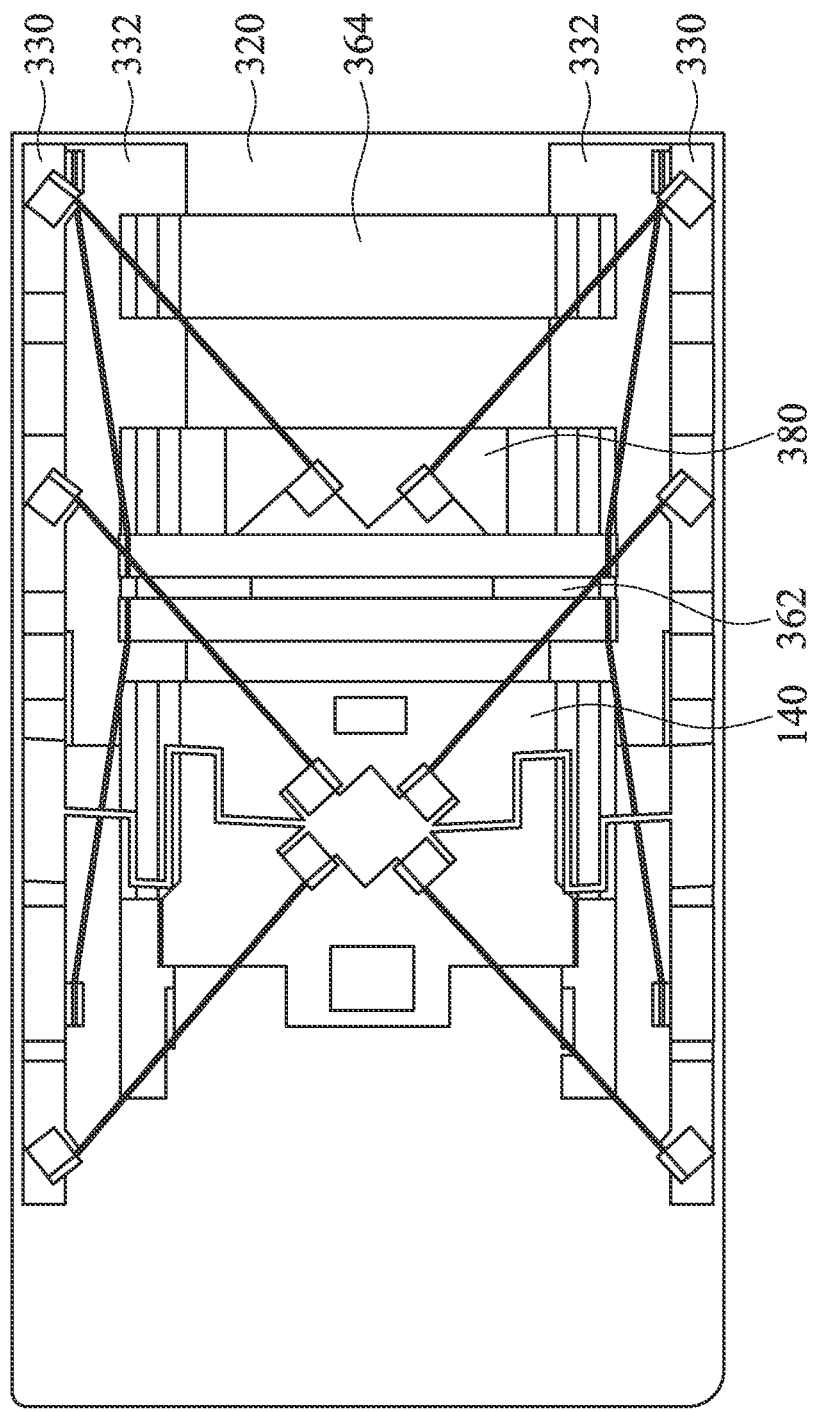
FIG. 11C is a top view of the optical element driving mechanism, and the case is omitted.

FIG. 11B is a schematic view of the optical element driving mechanism 300, and the case 310 is omitted. FIG. 11C is a top view of the optical element driving mechanism 300, and the case 310 is omitted. The structure of the optical element driving mechanism 300 is substantially similar to that of the optical element driving mechanism 100, and the description of similar elements will not be repeated here. It should be noted that the second movable portion 160 of the optical element driving mechanism 100 is replaced by a second movable portion 362 and a fixed holder 364, and the third movable portion 180 of the optical element driving mechanism 100 is replaced by a third movable portion 380.

The fixed holder 364 is affixed on extension portions 332 of sidewalls 330, and a fourth optical element (not shown) may be disposed in the fixed holder 364. The fourth optical element may be a special lens, such as may include glass, or may be low dispersion lens or may be a light filter. When the second movable portion 362 or the fourth movable portion 380 moves relative to the base 320, the fixed holder 364 may not move with the base 320, depending on design requirements. Furthermore, the fixed holder 364 may be used for limiting the movable range of the second movable portion 362 or the third movable portion 380.

Figure 12:
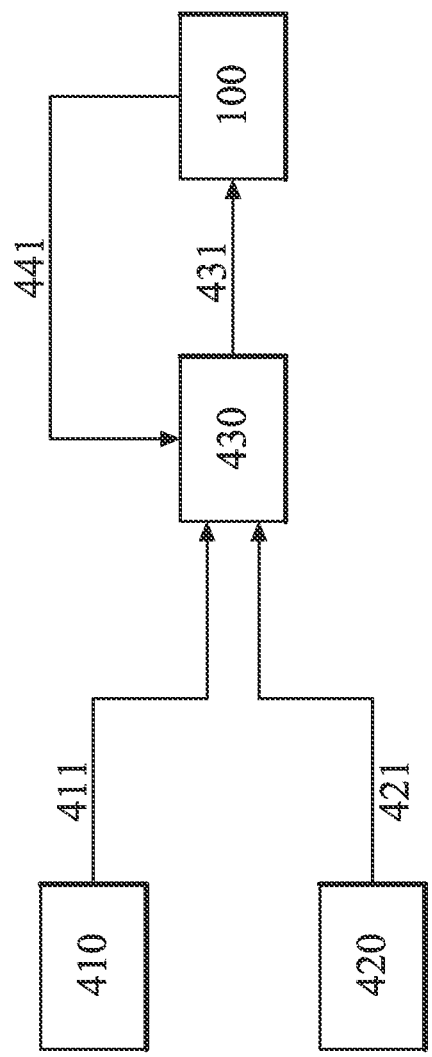
FIG. 12 is a schematic view of an optical element driving system in some embodiments of the present disclosure.

FIG. 12 is a schematic view of an optical element driving system 1 in some embodiments of the present disclosure. Not only the optical element driving mechanism 100, the optical element driving system further includes an inertia-sensing assembly 410, a temperature-sensing assembly 420, and a control assembly 430. As shown in FIG. 12, the inertia-sensing assembly 410 is used for detecting the movement of the optical element driving mechanism 100 and providing an inertia-sensing signal to the control assembly 430. The temperature-sensing assembly 420 is used for detecting the temperature of the optical element driving mechanism 100 and providing a temperature-sensing signal 421 to the control assembly 430. The control assembly 430 is sued for providing a driving signal 431 to the driving assembly D of the optical element driving mechanism 100 (which includes the first driving assembly 152, the second driving assembly 172, or the third driving assembly 192) so as to control the driving assembly D of the optical element driving mechanism 100. Furthermore, the position-sensing assembly 134 of the optical element driving mechanism 100 also provides a motion-sensing signal 441 to the control assembly 430.

After the control assembly 430 receives the inertia-sensing signal 411, the temperature-sensing signal 421, and the motion-sensing signal 441, the driving signal 431 may be determined by control information. The control information may be a combination of different information recorded in the control assembly 430 to allow the control assembly 430 effectively control the optical element driving mechanism 100 in different conditions.

In some embodiments, the control information includes sensing matching information. The sensing matching information includes the relationship between the movement (e.g. stroke or moving distance) of the movable portion M (which includes the first movable portion 140, the second movable portion 160, or the third movable portion 180) relative the fixed portion F and the motion-sensing signal 441. For example, the signal detected by the position-sensing assembly 134 and the moving distance of the movable portion M relative to the fixed portion F may be matched. Furthermore, in some embodiments, the control information includes correcting information used for correcting the sensing matching information. For instance, linear compensation may be applied to the sensing matching information, so that the sensing matching information may be closer to the actual movement of the movable portion M relative to the fixed portion F.

In some embodiments, the control information may include a predetermined position of the movable portion M relative to the fixed portion F, and may be used for defining the state of the movable portion M relative to the fixed portion F. for example the movable portion M (such as the first movable portion 140, the second movable portion 160, or the third movable portion 180) may be position at a middle position or an initial position.

In some embodiments, the control information may include a predetermined movable range of the movable portion M, and the movable portion M have to move within the movable range relative to the fixed portion F. In other words, the maximum movable range of the movable portion M relative to the fixed portion F may be defined as the predetermined movable range to prevent the movable portion M from being damaged due to exceeded moving range.

Figure 13A:
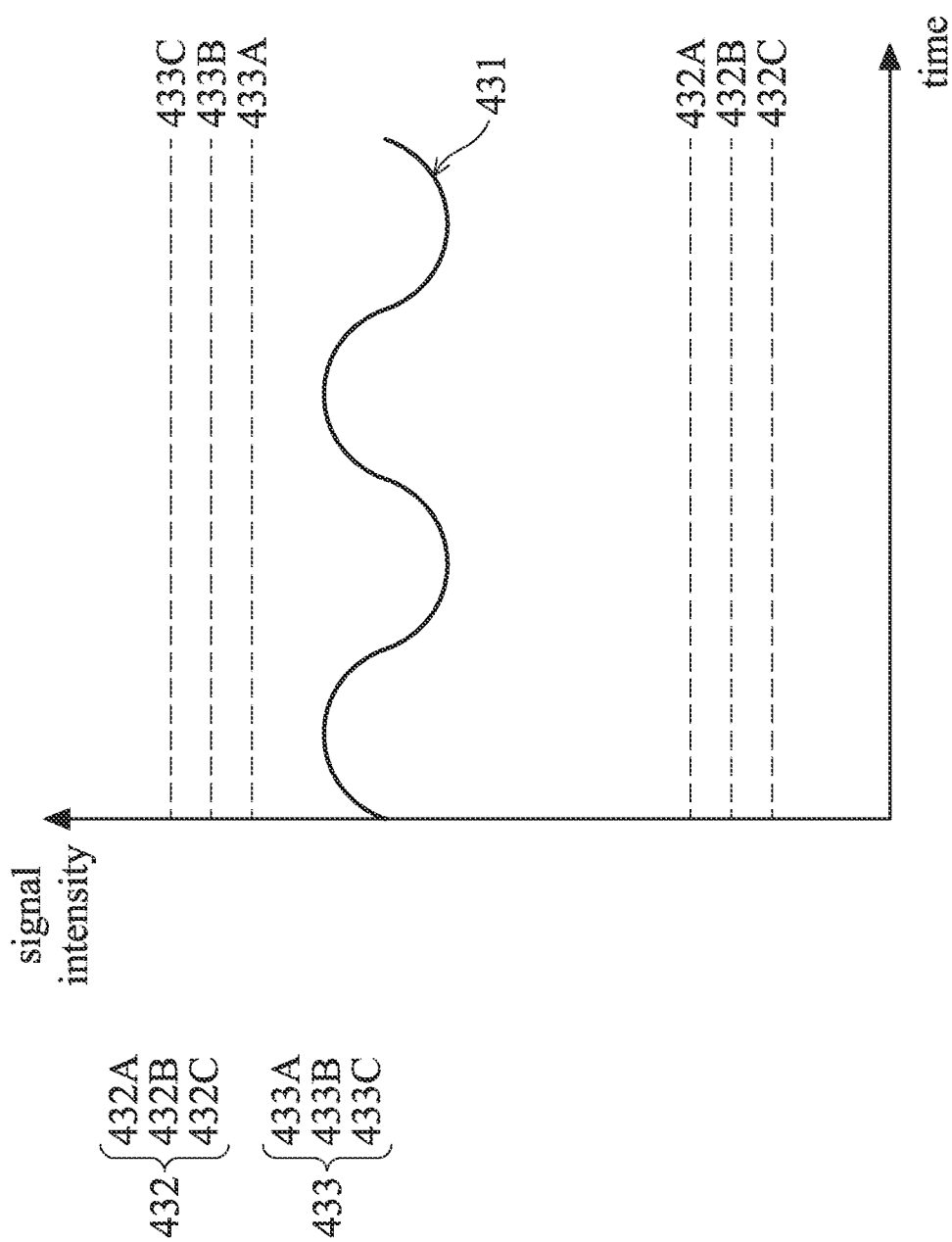
FIG. 13A is a schematic view of the driving signal.

FIG. 13A is a schematic view of the driving signal 431. In some embodiments, the control information may include first limit information 432 for defining the minimum value of the driving signal 431 and second limit information 433 for defining the maximum value of the driving signal 431. In other words, the range of the driving signal 431 is between the first limit information 432 and the second limit information 433. The first limit information 432 may be defined as the required minimum signal intensity provided to the optical element driving mechanism 100 when the optical element driving mechanism is stable.

As shown in FIG. 13A, the first limit information 432 may be defined by limit information 432A, 432B, and 432C. For example, the limit information 432A may include a minimum signal intensity (e.g. voltage or current) to allow the temperature of the first driving assembly 152, the second driving assembly 172, or the third driving assembly 192 increased to its phase transition temperature in a high-temperature condition (e.g. about 60 degree C.), and the first driving assembly 152, the second driving assembly 172, or the third driving assembly 192 includes shape memory alloy. The limit information 432B may include a minimum signal intensity (e.g. voltage or current) to allow the first driving assembly 152, the second driving assembly 172, or the third driving assembly 192 generate a tension higher than 0 in a high-temperature condition (e.g. about 60 degree C.), and the first driving assembly 152, the second driving assembly 172, or the third driving assembly 192 includes shape memory alloy. The limit information 432C may include a minimum signal intensity (e.g. voltage or current) to move the movable portion M to the predetermined position in a high-temperature condition (e.g. about 60 degree C.). The first limit information 432 may be chosen from the limit information 432A, 432B, or 432C, depending on design requirements. Moreover, FIG. 13A is only an example of the signal intensity of the limit information 432A, 432B, or 432C, and the present disclosure is not limited thereto. The signal intensity of the limit information 432A, 432B, or 432C may be changed based on actual condition.

The second limit information 433 may be defined as the maximum signal intensity than the optical element driving mechanism can withstand. If the signal intensity of the driving signal 431 is higher than the second limit information 433, the driving assembly D (the first driving assembly 152, the second driving assembly 172, or the third driving assembly 192) may be damaged. As shown in FIG. 13A, the second limit information may be defined by limit information 433A, 433B, and 433C.

For example, the limit information 433A may include the maximum signal intensity (e.g. voltage or current) when the size variation the first driving assembly 152, the second driving assembly 172, or the third driving assembly 192 is less than or equal to a boundary variation in a low-temperature condition (e.g. less than about −30 degree C.), and the first driving assembly 152, the second driving assembly 172, or the third driving assembly 192 includes shape memory alloy. The boundary variation may be defined as the variation that plastic deformation is about to occur when the first driving assembly 152, the second driving assembly 172, or the third driving assembly 192 deforms. In other words, if the deformation of the first driving assembly 152, the second driving assembly 172, or the third driving assembly 192 exceeds the boundary variation, plastic deformation will occur.

For example, the limit information 433B may include the maximum signal intensity (e.g. voltage or current) when the size variation rate the first driving assembly 152, the second driving assembly 172, or the third driving assembly 192 is less than a boundary variation rate. The boundary variation rate may be defined as the variation rate that plastic deformation is about to occur when the first driving assembly 152, the second driving assembly 172, or the third driving assembly 192 deforms. In other words, if the variation rate of the first driving assembly 152, the second driving assembly 172, or the third driving assembly 192 exceeds the boundary variation rate, plastic deformation will occur. The temperature of the high-temperature condition is higher than the low-temperature condition.

For example, the limit information 433C may include the maximum signal intensity (e.g. voltage or current) of the first driving assembly 152, the second driving assembly 172, or the third driving assembly 192 after used for a specific times (e.g. 30000 times) that makes the movable range of the first driving assembly 152, the second driving assembly 172, or the third driving assembly 192 less than a proportion (e.g. 5%) or a value (e.g. 10 μm).

Although the limit information 433C is shown as higher than the limit information 433B, and the limit information 433B is shown as higher than the limit information 433A, the present disclosure is not limited thereto. For example, the value of the limit information 433A, 433B, and 433C may change based on actual condition, and FIG. 13A only shows one of the conditions.

In some embodiments, the control information may include predetermined start information used for determining the predetermined value of the driving signal 431 when the optical element driving mechanism 100 starts. The predetermined start information may prevent the control assembly 430 provides a driving signal 431 that is too high or too low to the optical element driving mechanism 100.

In some embodiments, the control information may include temperature-compensation information used for correcting the influence caused by environmental temperature to the position-sensing assembly 134 and the driving assembly D (the first driving assembly 152, the second driving assembly 172, or the third driving assembly 192). Because the temperature-sensing assembly 420 and the driving assembly D may be influenced by temperature, the influence may be corrected by the temperature-compensation information.

Figure 13B:
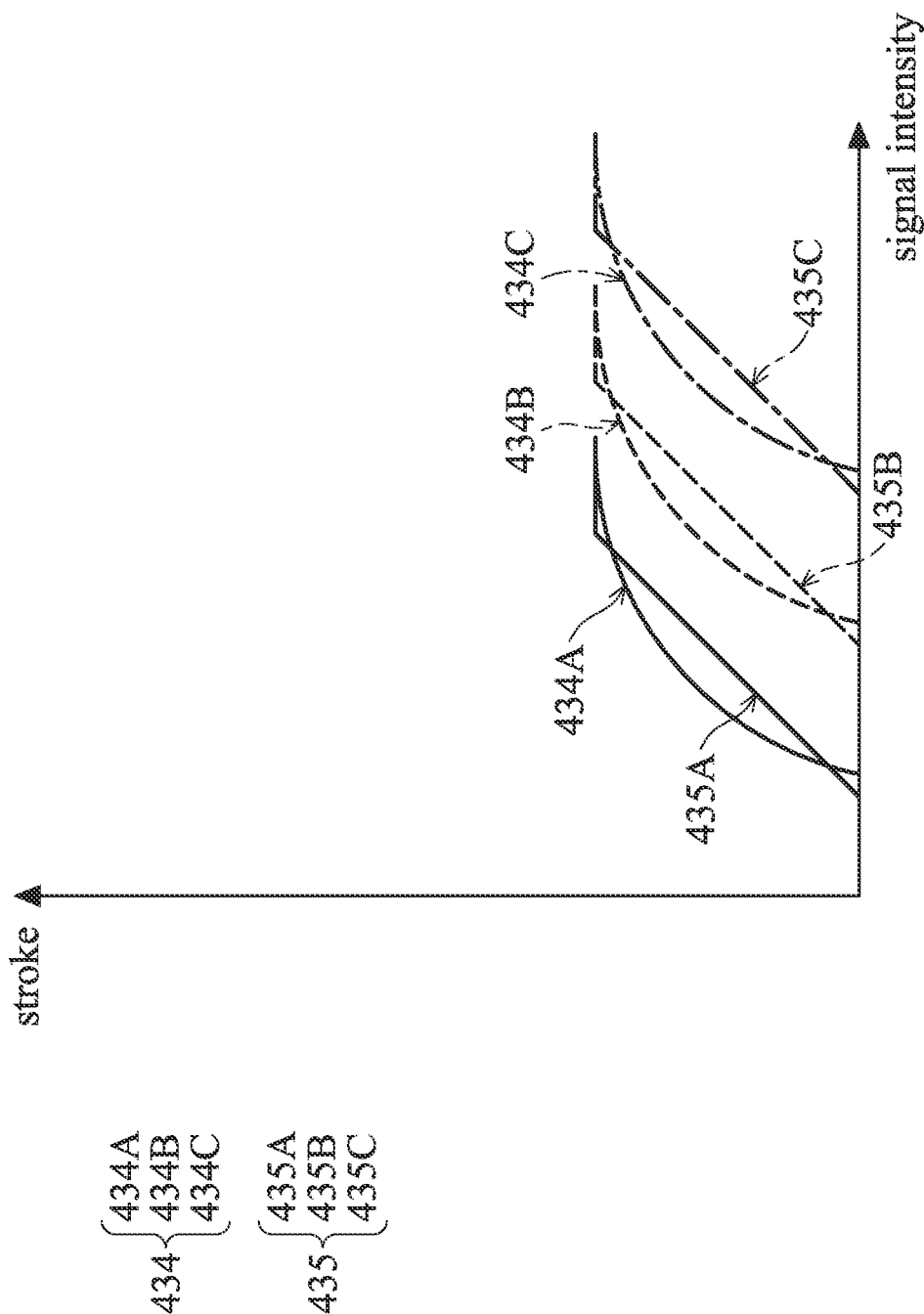
FIG. 13B is a schematic view of the temperature-compensation information.

For example, FIG. 13B shows a temperature matching relationship 434 (which includes temperature matching relationships 434A, 434B, and 434C) and temperature correct information 435 (which includes temperature correct information 435A, 435B, and 435C). The temperature matching relationships 434A, 434B, and 434C represent the relationships between the stroke of the movable portion M and the signal intensity of the driving assembly D in different environmental temperatures. In some embodiments, the environmental temperature of the temperature matching relationship 434A is higher than the temperature of the temperature matching relationship 434B, and the environmental temperature of the temperature matching relationship 434B is higher than the temperature of the temperature matching relationship 434C. For example, under the environmental temperature of the temperature matching relationship 434A, lower signal intensity is required to allow the movable portion M reach a desired stroke when compared with the environmental temperature of the temperature matching relationship 434B.

In some embodiments, linear compensation may be applied to the temperature matching relationship 434 to get the temperature correct information 435 (which includes temperature correct information 435A, 435B, and 435C), and the temperature correct information 435 may be recorded in the temperature-compensation information. Therefore, the relationship between the parameters may be linear, and the control method may be simplified. As a result, when the environmental temperature changes, the influence of the environmental temperature to the driving assembly D may be compensated by the temperature-compensation information. In some embodiments, the temperature-compensation information is not required, and the influence of the environmental temperature may be corrected based on the motion-sensing signal 441, based on design requirements.

In some embodiments, the control signal may include inertia-compensation information. The inertia-compensation information may include the relationship between the inertia-sensing signal 411 and the driving signal 431, the motion-sensing signal 441, or the image signal. The image signal may be signal provided by an optical sensor (not shown) in the optical element driving mechanism 100, in other words, the information received by the optical elements in the optical element driving mechanism 100. The inertia-compensation information may be used for compensating the influence of environments with different inertia to the optical element driving system 1, such as different moving speed or rotational angle, etc.

In some embodiments, the control information may include high-frequency filtering information. The control assembly 430 removes high frequency signal in the inertia sensing information 411, the temperature-sensing signal 421, the driving signal 431, and the motion-sensing signal 441 based on the high-frequency filtering information. The high frequency signal may be, for example, signal having frequency higher than 10000 Hz, or the maximum moving frequency of the optical element driving mechanism 100, and noise with exceed frequency may be filtered. Therefore, the elements in the optical element driving system 1 may be prevented from being influenced by the high frequency noise.

Figure 13C:
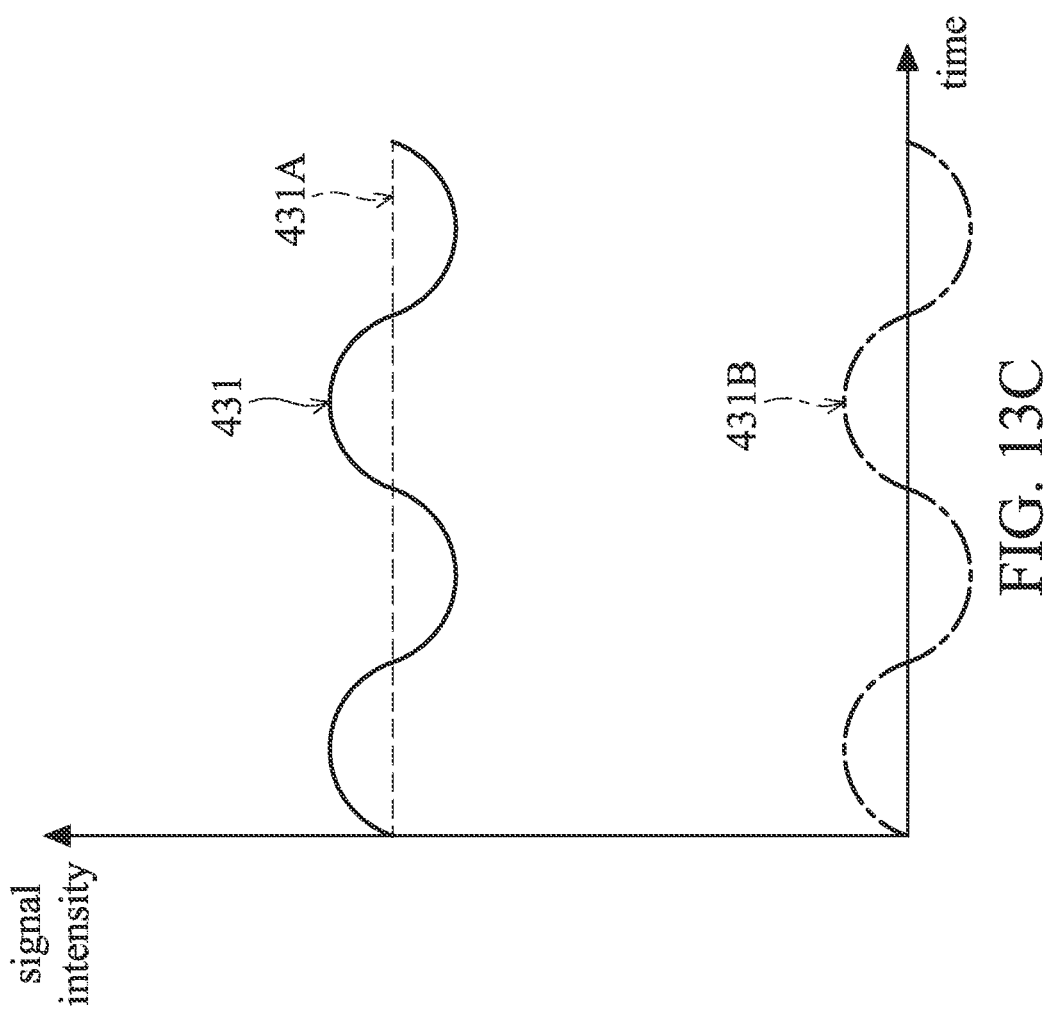
FIG. 13C is a schematic view of the driving signal.

FIG. 13C is a schematic view of the driving signal 431. In some embodiments, the driving signal 431 may include a first group of signals, which includes first signal 431A and second signal 431B. The first signal 431A may be DC signal (e.g. signal with 0 frequency), and the second signal 431B may be AC signal or a periodical signal (e.g. signal with a frequency higher than 0). In other words, the frequency of the first signal 431A is different than the frequency of the second signal 431B. The first group of signals may be a combination of the first signal 431A and the second signal 431B. Therefore, the intensity and the frequency, respectively, of the driving signal 431 may be controlled by controlling the first signal 431A and the second signal 431B.

In some embodiments, the optical element driving mechanism may include a stabilize assembly (such as the resilient element 153) to provide a predetermined force to the movable portion M. Although the resilient element 153 is taken as an example of the stabilize assembly, the present disclosure is not limited thereto. For example, a magnetic force may be provided to the movable portion M by a combination of magnetic elements to apply a predetermined force to the movable portion M when the movable portion M is not moving, depending on design requirements. Therefore, the movable portion M may be stabilized, such as the movable portion M may be limited in a specific range to prevent from colliding with other elements.

Figure 14:
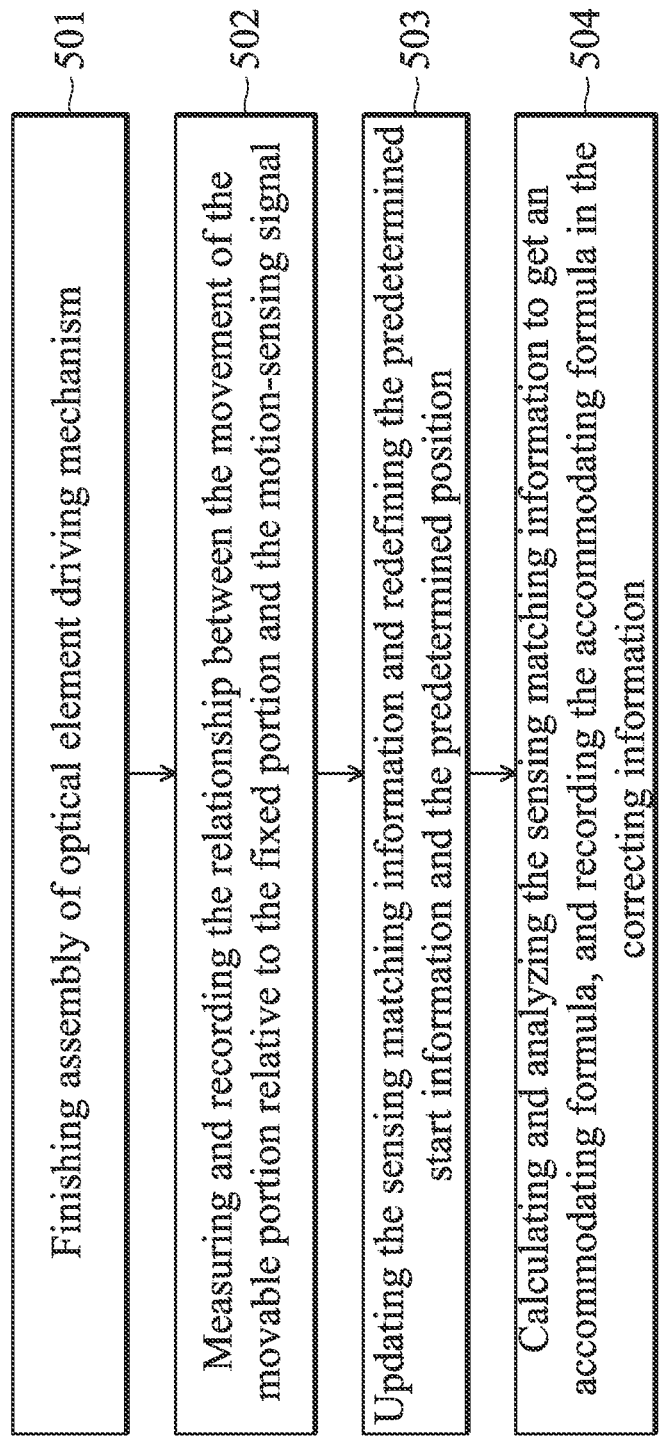
FIG. 14 is a block diagram of a correcting procedure.

In some embodiments, the control information may be corrected by a correcting procedure 500. FIG. 14 is a block diagram of the correcting procedure 500. First of all, the correcting procedure 500 includes step 501, in which the optical element driving mechanism 100 is assembled.

After step 501, the correcting procedure 500 further includes step 502, in which the relationship between the movement of the movable portion M relative to the fixed portion F and the motion-sensing signal 441 is measured and recorded by external equipment. In step 502, whether the motion-sensing signal 441 is able to reflect the relationship between the movement of the movable portion M relative to the fixed portion F may be determined.

After step 502, the correcting procedure 500 further includes step 503, in which the sensing matching information is updated, and the predetermined start information and the predetermined position are redefined. Because the movement of the movable portion M relative to the fixed portion F is measured by the external equipment in step 502, more correct sensing matching information may be achieved, and the predetermined start information and the predetermined position are redefined based on the sensing matching information. In some embodiments, whether the movable portion M moves relative to the fixed portion F in a predetermined movable range may be checked in step 503.

After step 503, the correcting procedure 500 further includes step 504, in which the sensing matching information is calculated and analyzed to get an accommodating formula, and the accommodating formula is recorded in the correcting information. Therefore, the control assembly 430 may compensate for the detected signal based on the accommodating formula.

In some embodiments, when the driving assembly D is initialized by the control assembly 430, the control assembly 430 may start the driving assembly D (e.g. the first driving assembly 152, the second driving assembly 172, or the third driving assembly 192) based on the temperature-sensing signal 421, the temperature-compensation information, the motion-sensing signal 441 and the predetermined start information to provide the driving signal 431 to the driving assembly D. When the driving signal 431 is provided by the control assembly 430 to control the driving assembly D, the intensity of the driving signal 431 is higher than the first limit information 432 and less than the second limit information 433 to ensure the driving assembly D may operate successfully rather than being damaged.

In some embodiments, when vibration compensation is performed by the driving assembly D to the movable portion M, the control assembly 430 may provide the driving signal 431 based on the inertia-sensing signal 411, the motion-sensing signal 441, and the inertia-compensation information. In some embodiments, the control assembly 430 may adjust the first signal 431A or the second signal 431B according to the temperature-sensing signal 421 and the temperature-compensation information. In some embodiments, the second signal 431B may be adjusted by the temperature-sensing signal 421 and the temperature-compensation information, and the frequency of the second signal 431B is higher than the first signal 431A. In some embodiments, the frequency of the second signal 431B may be less than 10000 Hz to effectively drive the driving assembly D. Furthermore, the amplitude of the second signal 431B may be greater than the first signal 431A.

In some embodiments, the driving signal 431 may include a second group of signals, wherein the first group of signals may be provided to one of the first driving assembly 152, the second driving assembly 172, and the third driving assembly 192, and the second group of signals may be provided to another one of the first driving assembly 152, the second driving assembly 172, and the third driving assembly 192. Furthermore, the control information may include proportion information to record the relationship between the first group of signals and the second group of signals. For example, the ratio of the total power of the first group of signals and the second group of signals may be recorded to provide signal with different intensities to different driving assemblies. In some embodiments, a third group of signals may be provided to control the driving assemblies separately.

Figure 15A:
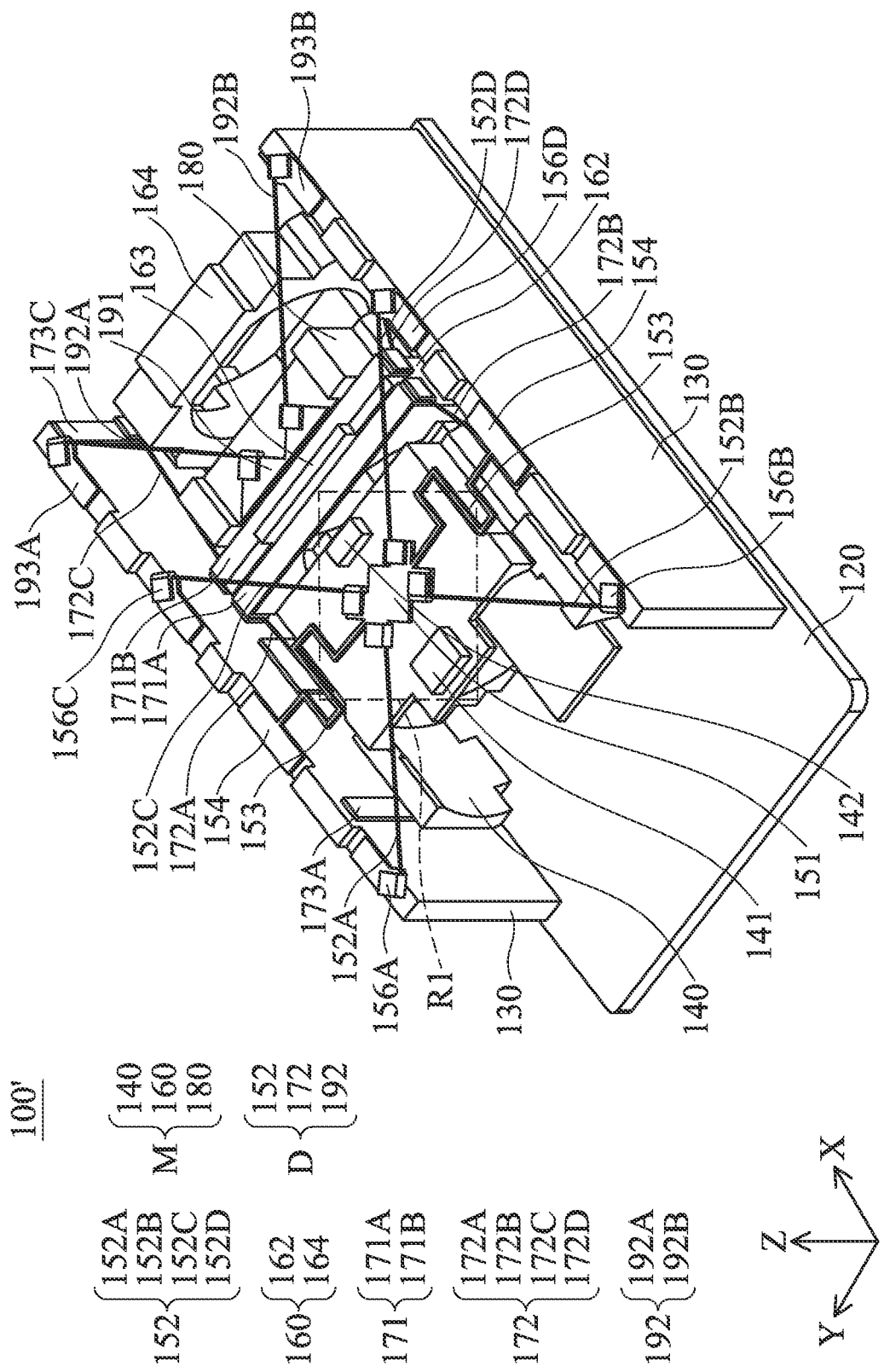
FIG. 15A is a schematic view of an optical element driving mechanism in some embodiments of the present disclosure.

FIG. 15A is a schematic view of an optical element driving mechanism 100'. The optical element driving mechanism 100' is substantially similar to the optical element driving mechanism 100, and the difference is that the position sensing assembly 134 is omitted from the optical element driving mechanism 100'. Therefore, required element number may be reduced to achieve miniaturization and reduce the cost.

Figure 15B:
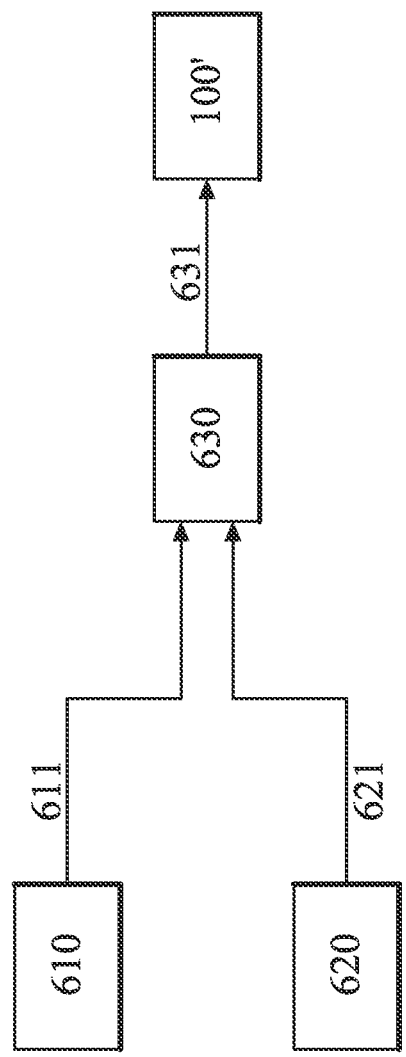
FIG. 15B is a schematic view of an optical element driving system in some embodiments of the present disclosure.

FIG. 15B is a schematic view of an optical element driving system 2 in some embodiments of the present disclosure. Not only the optical element driving mechanism 100', the optical element driving system further includes an inertia-sensing assembly 610, a temperature-sensing assembly 620, and a control assembly 630. As shown in FIG. 15, the inertia-sensing assembly 610 is used for detecting the movement of the optical element driving mechanism 100' and providing an inertia-sensing signal to the control assembly 630. The temperature-sensing assembly 620 is used for detecting the temperature of the optical element driving mechanism 100' and providing a temperature-sensing signal 621 to the control assembly 630. The control assembly 630 is sued for providing a driving signal 631 to the driving assembly D of the optical element driving mechanism 100' (which includes the first driving assembly 152, the second driving assembly 172, or the third driving assembly 192) so as to control the driving assembly D of the optical element driving mechanism 100'. In some embodiments, the inertia-sensing signal 611 includes a gravity direction signal used to provide the direction the gravity to the control assembly 630. In some embodiments, the optical element driving mechanism 100' further includes an optical sensor (not shown), and the temperature-sensing assembly 620 may be disposed adjacent to the optical sensor. For example, the distance between the temperature-sensing assembly 620 and the optical sensor may be less than about 15 mm to simplify the design of circuits.

After the control assembly 630 receives the inertia-sensing signal 611, and the temperature-sensing signal 621, the driving signal 631 may be determined by control information. The control information may be a combination of different information recorded in the control assembly 630 to allow the control assembly 630 effectively control the optical element driving mechanism 100' in different conditions.

In some embodiments, the control information includes posture correcting information that corresponds to the inertia-sensing signal 611. The posture correcting information is used for correcting the driving signal 631. For example, the influence caused from the gravity may be compensated by the posture correcting information after the control assembly receives the gravity direction signal. In some embodiments, an external apparatus (not shown) that is disposed outside the optical element driving system 2 is used for measuring the position of the movable portion M relative to the fixed portion F in different gravity conditions, so as to define the posture correcting information. The external apparatus may measure multiple times, and the measured result may be compare with theoretical value to increase the accuracy of the posture correcting information.

In some embodiments, the control information may include a predetermined position of the movable portion M relative to the fixed portion F, and may be used for defining the state of the movable portion M relative to the fixed portion F. for example the movable portion M (such as the first movable portion 140, the second movable portion 160, or the third movable portion 180) may be position at a middle position or an initial position.

In some embodiments, the control information may include a predetermined movable range of the movable portion M, and the movable portion M have to move within the movable range relative to the fixed portion F. In other words, the maximum movable range of the movable portion M relative to the fixed portion F may be defined as the predetermined movable range to prevent the movable portion M from being damaged due to exceeded moving range.

Figure 16A:
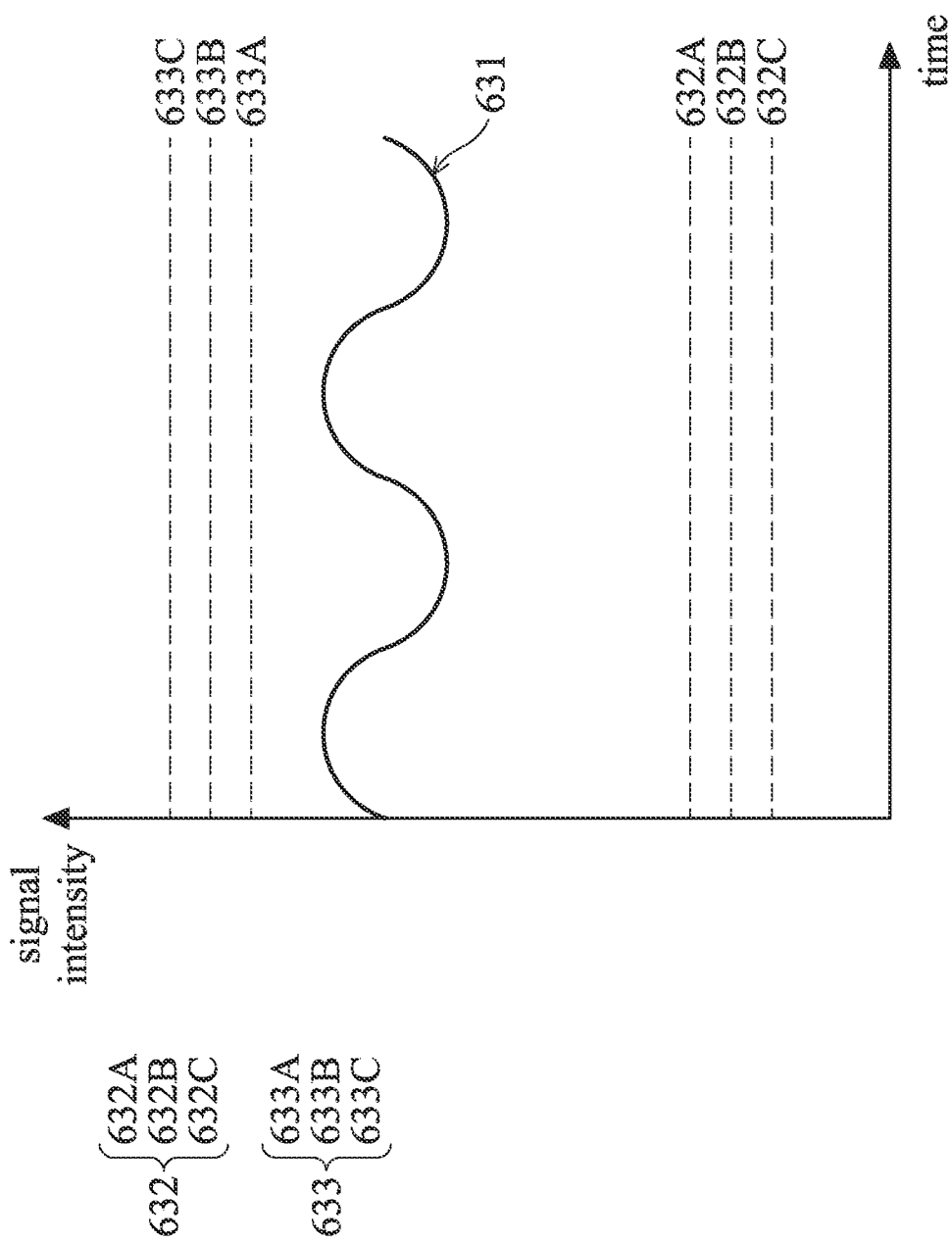
FIG. 16A is a schematic view of the driving signal.

FIG. 16A is a schematic view of the driving signal 631. In some embodiments, the control information may include first limit information 632 for defining the minimum value of the driving signal 631 and second limit information 633 for defining the maximum value of the driving signal 631. In other words, the range of the driving signal 631 is between the first limit information 632 and the second limit information 633. The first limit information 632 may be defined as the required minimum signal intensity provided to the optical element driving mechanism 100' when the optical element driving mechanism is stable.

As shown in FIG. 16A, the first limit information 632 may be defined by limit information 632A, 632B, and 632C. For example, the limit information 632A may include a minimum signal intensity (e.g. voltage or current) to allow the temperature of the first driving assembly 152, the second driving assembly 172, or the third driving assembly 192 increased to its phase transition temperature in a high-temperature condition (e.g. about 60 degree C.), and the first driving assembly 152, the second driving assembly 172, or the third driving assembly 192 includes shape memory alloy. The limit information 632B may include a minimum signal intensity (e.g. voltage or current) to allow the first driving assembly 152, the second driving assembly 172, or the third driving assembly 192 generate a tension higher than 0 in a high-temperature condition (e.g. about 60 degree C.), and the first driving assembly 152, the second driving assembly 172, or the third driving assembly 192 includes shape memory alloy. The limit information 632C may include a minimum signal intensity (e.g. voltage or current) to move the movable portion M to the predetermined position in a high-temperature condition (e.g. about 60 degree C.). The first limit information 632 may be chosen from the limit information 632A, 632B, or 632C, depending on design requirements. Moreover, FIG. 16A is only an example of the signal intensity of the limit information 632A, 632B, or 632C, and the present disclosure is not limited thereto. The signal intensity of the limit information 632A, 632B, or 632C may be changed based on actual condition.

The second limit information 633 may be defined as the maximum signal intensity than the optical element driving mechanism can withstand. If the signal intensity of the driving signal 631 is higher than the second limit information 633, the driving assembly D (the first driving assembly 152, the second driving assembly 172, or the third driving assembly 192) may be damaged. As shown in FIG. 16A, the second limit information may be defined by limit information 633A, 633B, and 633C.

For example, the limit information 633A may include the maximum signal intensity (e.g. voltage or current) when the size variation the first driving assembly 152, the second driving assembly 172, or the third driving assembly 192 is less than or equal to a boundary variation in a low-temperature condition (e.g. less than about −30 degree C.), and the first driving assembly 152, the second driving assembly 172, or the third driving assembly 192 includes shape memory alloy. The boundary variation may be defined as the variation that plastic deformation is about to occur when the first driving assembly 152, the second driving assembly 172, or the third driving assembly 192 deforms. In other words, if the deformation of the first driving assembly 152, the second driving assembly 172, or the third driving assembly 192 exceeds the boundary variation, plastic deformation will occur.

For example, the limit information 633B may include the maximum signal intensity (e.g. voltage or current) when the size variation rate the first driving assembly 152, the second driving assembly 172, or the third driving assembly 192 is less than a boundary variation rate. The boundary variation rate may be defined as the variation rate that plastic deformation is about to occur when the first driving assembly 152, the second driving assembly 172, or the third driving assembly 192 deforms. In other words, if the variation rate of the first driving assembly 152, the second driving assembly 172, or the third driving assembly 192 exceeds the boundary variation rate, plastic deformation will occur. The temperature of the high-temperature condition is higher than the low-temperature condition.

For example, the limit information 633C may include the maximum signal intensity (e.g. voltage or current) of the first driving assembly 152, the second driving assembly 172, or the third driving assembly 192 after used for a specific times (e.g. 30000 times) that makes the movable range of the first driving assembly 152, the second driving assembly 172, or the third driving assembly 192 less than a proportion (e.g. 5%) or a value (e.g. 10 μm).

Although the limit information 633C is shown as higher than the limit information 633B, and the limit information 633B is shown as higher than the limit information 633A, the present disclosure is not limited thereto. For example, the value of the limit information 633A, 633B, and 633C may change based on actual condition, and FIG. 16A only shows one of the conditions.

In some embodiments, the control information may include predetermined start information used for determining the predetermined value of the driving signal 631 when the optical element driving mechanism 100' starts. The predetermined start information may prevent the control assembly 630 provides a driving signal 631 that is too high or too low to the optical element driving mechanism 100'.

In some embodiments, the control information may include temperature-compensation information used for correcting the influence caused by environmental temperature to the position-sensing assembly 134 and the driving assembly D (the first driving assembly 152, the second driving assembly 172, or the third driving assembly 192). Because the temperature-sensing assembly 620 and the driving assembly D may be influenced by temperature, the influence may be corrected by the temperature-compensation information.

Figure 16B:
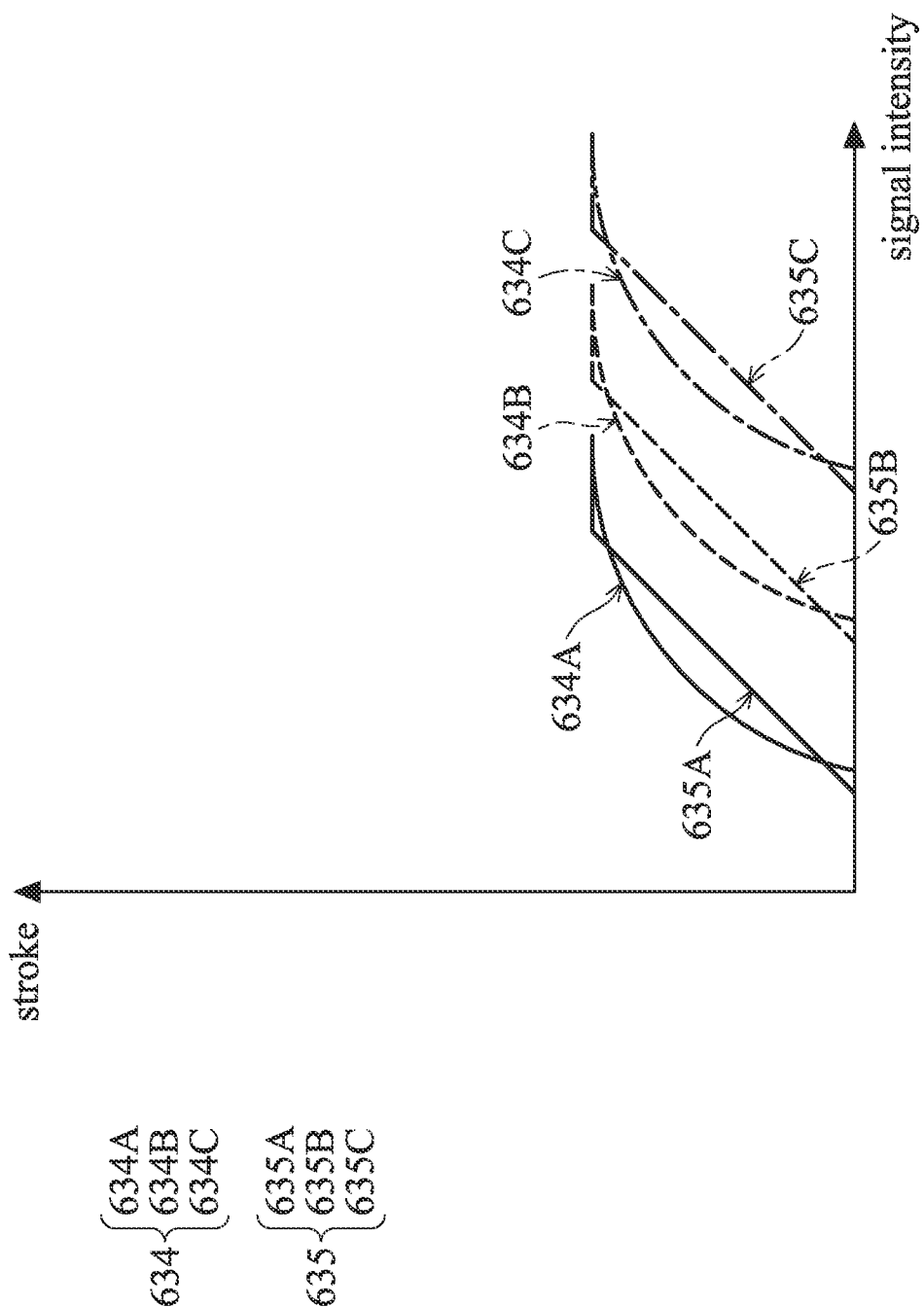
FIG. 16B is a schematic view of the temperature-compensation information.

For example, FIG. 16B shows a temperature matching relationship 634 (which includes temperature matching relationships 634A, 634B, and 634C) and temperature correct information 635 (which includes temperature correct information 635A, 635B, and 635C). The temperature matching relationships 634A, 634B, and 634C represent the relationships between the stroke of the movable portion M and the signal intensity of the driving assembly D in different environmental temperatures. In some embodiments, the environmental temperature of the temperature matching relationship 634A is higher than the temperature of the temperature matching relationship 634B, and the environmental temperature of the temperature matching relationship 634B is higher than the temperature of the temperature matching relationship 634C. For example, under the environmental temperature of the temperature matching relationship 634A, lower signal intensity is required to allow the movable portion M reach a desired stroke when compared with the environmental temperature of the temperature matching relationship 634B.

In some embodiments, linear compensation may be applied to the temperature matching relationship 634 to get the temperature correct information 635 (which includes temperature correct information 635A, 635B, and 635C), and the temperature correct information 635 may be recorded in the temperature-compensation information. Therefore, the relationship between the parameters may be linear, and the control method may be simplified. As a result, when the environmental temperature changes, the influence of the environmental temperature to the driving assembly D may be compensated by the temperature-compensation information.

In some embodiments, the control signal may include inertia-compensation information. The inertia-compensation information may include the relationship between the inertia-sensing signal 611 and the driving signal 631, or the image signal. The image signal may be signal provided by an optical sensor (not shown) in the optical element driving mechanism 100', in other words, the information received by the optical elements in the optical element driving mechanism 100'. The inertia-compensation information may be used for compensating the influence of environments with different inertia to the optical element driving system 2, such as different moving speed or rotational angle, etc.

In some embodiments, the control information may include high-frequency filtering information. The control assembly 630 removes high frequency signal in the inertia-sensing information 611, the temperature-sensing signal 621, the driving signal 631, based on the high-frequency filtering information. The high frequency signal may be, for example, signal having frequency higher than 10000 Hz, or the maximum moving frequency of the optical element driving mechanism 100', and noise with exceed frequency may be filtered. Therefore, the elements in the optical element driving system 2 may be prevented from being influenced by the high frequency noise.

Figure 16C:
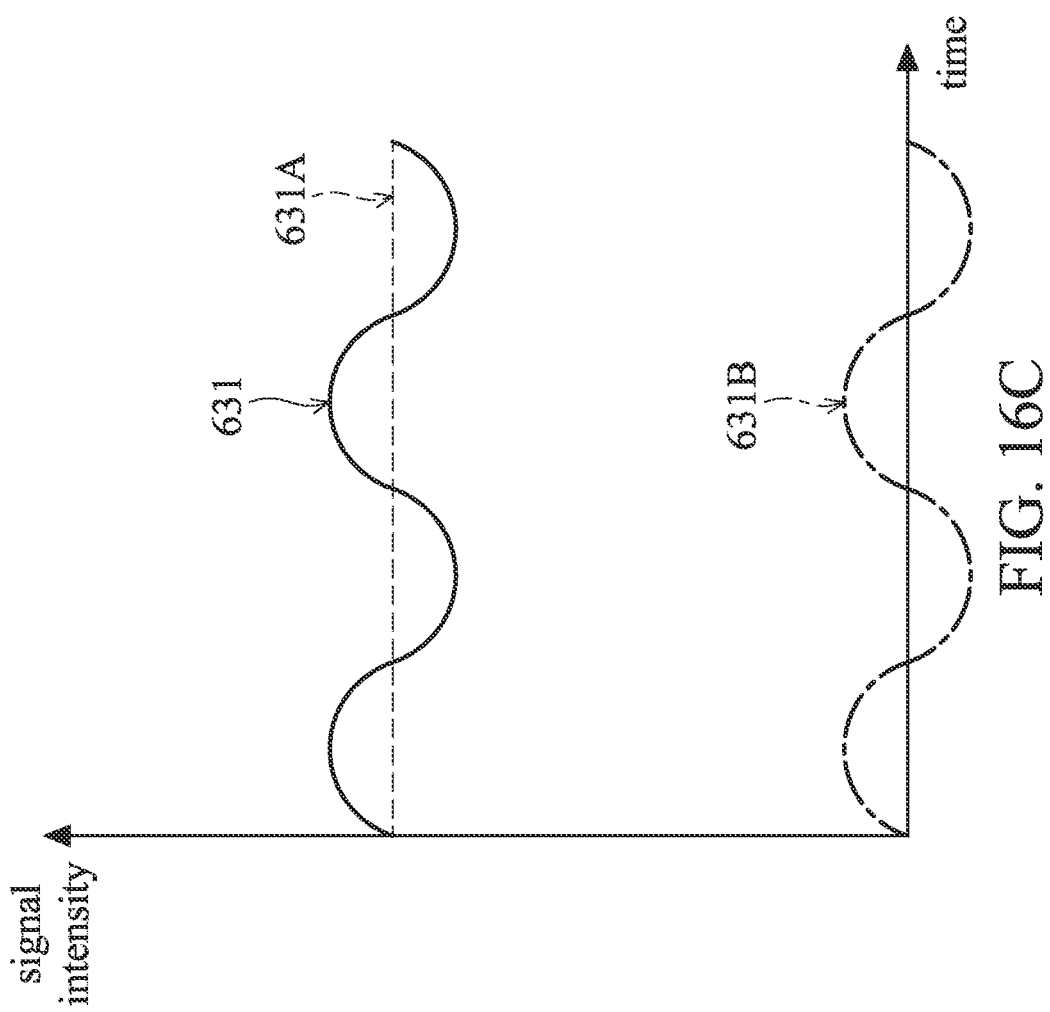
FIG. 16C is a schematic view of the driving signal.

FIG. 16C is a schematic view of the driving signal 631. In some embodiments, the driving signal 631 may include a first group of signals, which includes first signal 631A and second signal 631B. The first signal 631A may be DC signal (e.g. signal with 0 frequency), and the second signal 631B may be AC signal or a periodical signal (e.g. signal with a frequency higher than 0). In other words, the frequency of the first signal 631A is different than the frequency of the second signal 631B. The first group of signals may be a combination of the first signal 631A and the second signal 631B. Therefore, the intensity and the frequency, respectively, of the driving signal 631 may be controlled by controlling the first signal 631A and the second signal 631B.

In some embodiments, the optical element driving mechanism may include a stabilize assembly (such as the resilient element 153) to provide a predetermined force to the movable portion M. Although the resilient element 153 is taken as an example of the stabilize assembly, the present disclosure is not limited thereto. For example, a magnetic force may be provided to the movable portion M by a combination of magnetic elements to apply a predetermined force to the movable portion M when the movable portion M is not moving, depending on design requirements. Therefore, the movable portion M may be stabilized, such as the movable portion M may be limited in a specific range to prevent from colliding with other elements.

In some embodiments, when the driving assembly D is initialized by the control assembly 630, the control assembly 630 may start the driving assembly D (e.g. the first driving assembly 152, the second driving assembly 172, or the third driving assembly 192) based on the temperature-sensing signal 621, the temperature-compensation information, the inertia-sensing information 611 (such as the gravity direction signal), the inertia-compensation information, the posture correcting information, and the predetermined start information to provide the driving signal 631 to the driving assembly D. When the driving signal 631 is provided by the control assembly 630 to control the driving assembly D, the intensity of the driving signal 631 is higher than the first limit information 632 and less than the second limit information 633 to ensure the driving assembly D may operate successfully rather than being damaged. Alternatively, in some embodiments, when the driving assembly D is started by the control assembly 630, the control assembly 630 receives a target signal from an external element. For example, if the optical element driving system 2 is installed in an electronic device, the central processing unit of the electronic device may provide the target signal to the control assembly 630. Afterwards, the driving signal 631 is provided to the optical element driving mechanism 100 by the control assembly 630 based on the temperature sensing signal 621, the temperature-compensation information, the inertia-sensing signal 611 (such as the gravity direction signal), inertia-compensation information, the posture correcting information, and the target signal.

In some embodiments, when vibration compensation is performed by the driving assembly D to the movable portion M, the control assembly 630 may provide the driving signal 631 based on the inertia-sensing signal 611, and the inertia-compensation information. In some embodiments, the first signal 631A and the second signal 631B may be adjusted according to the temperature sensing signal 621 and the temperature-compensation information. In some embodiments, the second signal 631B may be adjusted by the temperature-sensing signal 621 and the temperature-compensation information, and the frequency of the second signal 631B is higher than the first signal 631A. In some embodiments, the frequency of the second signal 631B may be less than 10000 Hz to effectively drive the driving assembly D. Furthermore, the amplitude of the second signal 631B may be greater than the first signal 631A.

In some embodiments, the driving signal 631 may include a second group of signals, wherein the first group of signals may be provided to one of the first driving assembly 152, the second driving assembly 172, and the third driving assembly 192, and the second group of signals may be provided to another one of the first driving assembly 152, the second driving assembly 172, and the third driving assembly 192. Furthermore, the control information may include proportion information to record the relationship between the first group of signals and the second group of signals. For example, the ratio of the total power of the first group of signals and the second group of signals may be recorded to provide signal with different intensities to different driving assemblies. In some embodiments, a third group of signals may be provided to control the driving assemblies separately.

Figure 17:
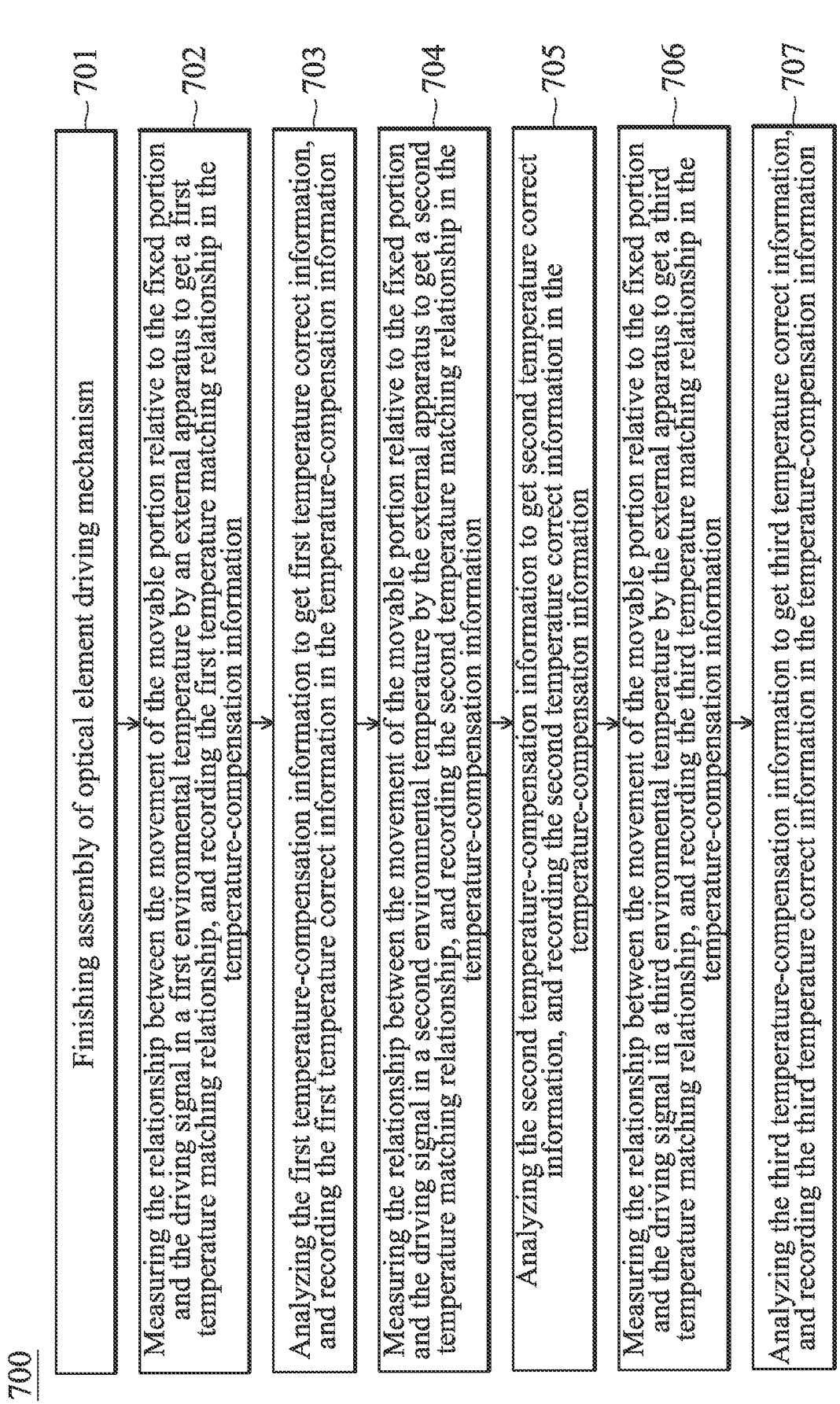
FIG. 17 is a block diagram of a correcting procedure.

A correcting procedure 700 used for achieving the temperature matching relationship 634 and the temperature correct information 635 is described. FIG. 17 is a block diagram of the correcting procedure 700, which starts from a step 701. In the step 701, the optical element driving mechanism is assembled.

In a step 702, the relationship between the motion of the movable portion M relative to the fixed portion F (e.g. stroke, the Y axis in FIG. 16B) and the driving signal 631 (such as signal intensity, the X axis in FIG. 16B) in a first environmental temperature may be measured by an external equipment (not shown) to achieve the temperature matching relationship 634A (first temperature matching relationship), and the temperature matching relationship 634A is recorded in the temperature-compensation information. Afterwards, in a step 703, the temperature matching relationship 634A may be analyzed, such as performing linear compensation to the temperature matching relationship 634A, to get the temperature correct information 635A (first temperature correct information). The temperature correct information 635A may be recorded in the temperature-compensation information.

In a step 704, the relationship between the motion of the movable portion M relative to the fixed portion F and the driving signal 631 in a second environmental temperature may be measured by the external equipment to achieve the temperature matching relationship 634B (second temperature matching relationship), and the temperature matching relationship 634B is recorded in the temperature-compensation information. Afterwards, in a step 705, the temperature matching relationship 634B may be analyzed, such as performing linear compensation to the temperature matching relationship 634B, to get the temperature correct information 635B (second temperature correct information). The temperature correct information 635B may be recorded in the temperature-compensation information.

In a step 706, the relationship between the motion of the movable portion M relative to the fixed portion F and the driving signal 631 in a third environmental temperature may be measured by the external equipment to achieve the temperature matching relationship 634C (third temperature matching relationship), and the temperature matching relationship 634C is recorded in the temperature-compensation information. Afterwards, in a step 707, the temperature matching relationship 634C may be analyzed, such as performing linear compensation to the temperature matching relationship 634C, to get the temperature correct information 635C (third temperature correct information). The temperature correct information 635C may be recorded in the temperature-compensation information. It should be noted that the first environmental temperature, the second environmental temperature, and the third environmental temperature are different. Taken FIG. 16B as an example, the first environmental temperature is higher than the second environmental temperature, and the second environmental temperature is higher than the third environmental temperature, but is not limited thereto.

In summary, an optical element driving system is provided. The optical element driving system includes an optical element driving mechanism and a control assembly. The optical element driving mechanism includes a movable portion, a fixed portion, a driving assembly, and a position-sensing assembly. The movable portion is used for connecting to an optical element. The movable portion is movable relative to the fixed portion. The movable portion is in an accommodating space in the fixed portion. The driving assembly is used for driving the movable portion to move relative to the fixed portion. The control assembly provides a driving signal to the driving assembly to control the driving assembly. The position-sensing assembly is used for detecting the movement of the movable portion relation to the fixed portion and providing motion-sensing signal to the control assembly. Therefore, the driving assembly may be effectively controlled, and miniaturization may be achieved. Moreover, the control information that includes various information may allow the optical element driving mechanism be controlled in a more accurate manner.

Although embodiments of the present disclosure and their advantages have been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving system, comprising:
   an optical element driving mechanism, comprising:
   a first movable portion used for connecting an optical element;
   a second movable portion used for connecting a second optical element;
   a third movable portion used for connecting a third optical element;
   a fixed portion, wherein the first movable portion is movable relative to the fixed portion along a main axis and in a first direction and a second direction perpendicular to the main axis, the second movable portion is movable relative to the fixed portion along the main axis and in the first direction, and the third movable portion is movable relative to the fixed portion along the main axis and in the first direction, wherein the first direction is perpendicular to the second direction, and the first movable portion, the second movable portion, and the third movable portion are in an accommodating space in the fixed portion;
   a first driving assembly used for driving the first movable portion to move relative to the fixed portion, comprising a first driving element, and the material of the first driving element comprises shape memory alloy;
   a second driving assembly used for driving the second movable portion to move relative to the fixed portion;
   a third driving assembly used for driving the third movable portion to move relative to the fixed portion, wherein the first movable portion, the second movable portion, and the third movable portion are arranged along the main axis, and the first driving assembly, the second driving assembly, and the third driving assembly are disposed on an identical side of a first surface of the fixed portion; and
   a control assembly used for controlling the first driving assembly.

2. The optical element driving system as claimed in claim 1, further comprising:
   a stabilized assembly used for providing a predetermined force to the first movable portion;
   an inertia-sensing assembly used for detecting the movement of the optical element driving mechanism and providing an inertia-sensing signal to the control assembly;
   a temperature-sensing assembly used for detecting the temperature of the optical element driving mechanism and providing a temperature-sensing signal to the control assembly;
   a position-sensing assembly disposed in the fixed portion, wherein the position-sensing assembly provides a motion-sensing signal to the control assembly;
   wherein the temperature-sensing assembly is adjacent to an optical sensor;
   the control assembly provides a driving signal based on control information, and the control information comprises:
      posture correcting information corresponding to the inertia-sensing signal, configured to correcting the relationship between the movement of the first movable portion relative to the fixed portion and the driving signal, wherein the posture correcting information is defined as a state of the first movable portion relative to the fixed portion in different gravity directions measured by an external equipment;
      a predetermined position configured to defining a condition of the first movable portion relative to the fixed portion when the optical element driving mechanism is started;
      a predetermined movable range defining a maximum movable range of the first movable portion relative to the fixed portion;
      first limiting information used to limit a minimum value of the driving signal;
      wherein in a high-temperature condition, the first limiting information is defined as one of the following:
         a current or a voltage that increases the temperature of the first driving assembly to the phase transition temperature of the first driving assembly;
         a minimum current or a minimum voltage required to make the first driving assembly generate a tension higher than 0;
         a minimum current or a minimum voltage required to move the first movable portion to the predetermined position;
      second limiting information used to limit a maximum value of the driving signal;
      wherein in a low-temperature condition, the second limiting information is defined as one of the following:
         a maximum current or a maximum voltage when the shape variation of the first driving assembly is less than or equal to a boundary variation, and the boundary variation is defined as the variation of the first driving assembly that plastic deformation is about to occur when the first driving assembly is deformed;
         the maximum current or the maximum voltage when the shape variation rate of the first driving assembly is less than or equal to a boundary variation rate, and the boundary variation rate is defined as the variation rate of the first driving assembly that plastic deformation is about to occur when the first driving assembly is deformed;
         the maximum current or the maximum voltage when a variation of the predetermined movable range is less than a ratio after the first driving assembly is used for a certain number of times;
      wherein the temperature of the high-temperature condition is higher than the temperature of the low-temperature condition;
      predetermined start information configured to determining a predetermined value of the driving signal when the optical element driving mechanism starts;

inertia compensating information pertaining to the relationship between the inertia-sensing signal and the driving signal, or an image signal;

high-frequency filtering information, wherein a high-frequency signal in the motion-sensing signal, or the driving signal is removed by the control assembly based on the high-frequency filtering information;

wherein a frequency of the high frequency defined by the high-frequency filtering information is higher than 10000 Hz;

wherein the high-frequency filtering information is defined by a maximum movable frequency of the optical element driving mechanism;

wherein the image signal is generated by an optical sensor;

wherein the driving signal comprises a first group of signals, comprising:
a first signal; and
a second signal, wherein the frequency of the first signal is different than the frequency of the second signal.

3. The optical element driving system as claimed in claim 2, wherein the first driving assembly further comprises a second driving element, the material of the second driving element comprises a shape memory alloy, when the control assembly provides a driving signal, a direction of a driving force generated by the first driving element is different than a direction of a driving force generated by the second driving element;

wherein the driving signal further comprises a second group of signals, the first group of signals is provided to the first driving element, the second group of signals is provided to the second driving element, the power of the first group of signals is different than the power of the second group of signals, and the control information further comprises proportion information used for recording the relationship between the first group of signals and the second group of signals.

4. The optical element driving system as claimed in claim 1, wherein the first movable portion and the fixed portion are connected through the first driving assembly.

5. The optical element driving system as claimed in claim 1, wherein the second movable portion and the fixed portion are connected through the second driving assembly.

6. The optical element driving system as claimed in claim 1, wherein the second movable portion and the third movable portion are connected through the third driving assembly.

7. A method used for controlling optical element driving system as claimed in claim 2, wherein the control information further comprises a correcting procedure, comprising:

finishing the assembly of the optical element driving mechanism;

measuring the relationship between the motion of the first movable portion relative to the fixed portion and the driving signal in a first environmental temperature to achieve a first temperature matching relationship, and recording the first temperature matching relationship in the temperature-compensation information;

analyzing the first temperature matching relationship to get first temperature correct information, and recording the first temperature correct information in the information;

measuring the relationship between the motion of the first movable portion relative to the fixed portion and the driving signal in a second environmental temperature to achieve a second temperature matching relationship, and recording the second temperature matching relationship in the temperature-compensation information;

analyzing the second temperature matching relationship to get second temperature correct information, and recording the second temperature correct information in the information;

measuring the relationship between the motion of the first movable portion relative to the fixed portion and the driving signal in a third environmental temperature to achieve a third temperature matching relationship, and recording the third temperature matching relationship in the temperature-compensation information;

analyzing the third temperature matching relationship to get third temperature correct information, and recording the third temperature correct information in the information;

wherein the first environmental temperature, the second environmental temperature, and the third environmental temperature are different.

8. The method as claimed in claim 7, wherein the control assembly starts the first driving assembly based on the temperature-sensing signal, the temperature-compensation information, the motion-sensing signal, and the predetermined start information by providing a driving signal to the first driving assembly.

9. The method as claimed in claim 7, wherein when the first driving assembly is controlled by the driving signal provided by the control assembly, the intensity of the driving signal is higher than the intensity of the first limiting information and lower than the intensity of the second limiting information.

10. The method as claimed in claim 7, wherein during a vibration compensation, the control assembly provides a driving signal based on the inertia-compensation information, the motion-sensing signal, and the inertia-compensation signal.

11. The method as claimed in claim 7, wherein the control assembly adjusts the first signal or the second signal based on the temperature-sensing signal and the temperature-compensation information.

12. The method as claimed in claim 7, wherein the control assembly adjusts the second signal based on the temperature-sensing signal and the temperature-compensation information, the frequency of the second signal is higher than the frequency of the first signal, and the frequency of the second signal is less than 10000 Hz.

13. The method as claimed in claim 12, wherein the amplitude of the second signal is higher than the amplitude of the first signal.

* * * * *